United States Patent
Cernoch et al.

(10) Patent No.: US 12,238,012 B2
(45) Date of Patent: Feb. 25, 2025

(54) SYSTEMS AND METHODS FOR QUEUE CONTROL BASED ON CLIENT-SPECIFIC PROTOCOLS

(71) Applicant: Live Nation Entertainment, Inc., Beverly Hills, CA (US)

(72) Inventors: Dan Cernoch, Los Angeles, CA (US); Jacob Plotkin, Los Angeles, CA (US); Jonathan Palace, Tarzana, CA (US); Carl Gorenberg, Los Angeles, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

(21) Appl. No.: 18/444,577

(22) Filed: Feb. 16, 2024

(65) Prior Publication Data
US 2024/0275738 A1    Aug. 15, 2024

Related U.S. Application Data

(63) Continuation of application No. 17/839,275, filed on Jun. 13, 2022, now Pat. No. 11,909,665, which is a continuation of application No. 17/011,644, filed on Sep. 3, 2020, now Pat. No. 11,362,962, which is a continuation of application No. 16/812,051, filed on Mar. 6, 2020, now Pat. No. 10,771,398.

(60) Provisional application No. 62/814,644, filed on Mar. 6, 2019.

(51) Int. Cl.
*H04L 47/78* (2022.01)
*H04L 9/40* (2022.01)
*H04L 47/125* (2022.01)
*H04L 47/52* (2022.01)
*H04L 67/60* (2022.01)

(52) U.S. Cl.
CPC .......... *H04L 47/781* (2013.01); *H04L 47/125* (2013.01); *H04L 47/527* (2013.01); *H04L 63/0876* (2013.01); *H04L 63/10* (2013.01); *H04L 67/60* (2022.05)

(58) Field of Classification Search
CPC ... H04L 47/781; H04L 47/125; H04L 47/527; H04L 63/0876; H04L 63/10; H04L 67/60; G06F 9/52; G06F 21/44; G06F 21/6236; G06F 2209/522; G06F 9/468
See application file for complete search history.

(56) References Cited

U.S. PATENT DOCUMENTS

2019/0095510 A1 * 3/2019 Cruise ............... G06F 16/24568
2019/0235941 A1 * 8/2019 Bath .................... G06F 11/079

* cited by examiner

*Primary Examiner* — El Hadji M Sall
(74) *Attorney, Agent, or Firm* — MUGHAL GAUDRY & FRANKLIN PC

(57) ABSTRACT

The present disclosure generally relates to controlling access to resources by selectively processing requests stored in a task queue to prioritize certain requests over others, thereby preventing automated scripts from accessing the resources. More specifically, the present disclosure relates to a normalization and prioritization system for controlling access to resources by queuing resource requests based on a client-defined normalization process that uses one or more data sources.

20 Claims, 16 Drawing Sheets

SYSTEMS AND METHODS FOR QUEUE CONTROL BASED ON CLIENT-SPECIFIC PROTOCOLS

PRIORITY

This application is a continuation of U.S. application Ser. No. 17/839,275, filed Jun. 13, 2022, which is a continuation of U.S. application Ser. No. 17/011,644, filed Sep. 3, 2020, now U.S. Pat. No. 11,362,962, issued Jun. 14, 2022, which is a continuation of U.S. application Ser. No. 16/812,051, filed on Mar. 6, 2020, now U.S. Pat. No. 10,771,398, issued on Sep. 8, 2020, which claims the priority benefit of U.S. Provisional Application No. 62/814,644, filed on Mar. 6, 2019, the disclosure of each of which is incorporated herein by reference in its entirety for all purposes.

TECHNICAL FIELD

The present disclosure generally relates to controlling access to resources by selectively processing requests stored in a task queue to prioritize certain requests over others, thereby preventing automated scripts from accessing the resources. More specifically, the present disclosure relates to a normalization and prioritization system for controlling access to resources by queuing resource requests based on a client-defined normalization process that uses one or more data sources.

BACKGROUND

Automated scripts can be configured to access interfaces and mimic user actions, such as selecting links and transmitting user requests. Further, automated scripts can impose a burden on the computational efficiency of systems, network traffic, and processing load of servers, such as servers that control access to resources. Detecting requests originating from automated scripts, however, is a significant technical challenge. As automated scripts become more complex, detecting which requests originated from an automated script is increasingly challenging and burdensome on processing resources. Additionally, automated scripts may be configured differently for different resources, and thus, techniques for detecting automated scripts targeting one resource may not successfully control access to another resource.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain aspects and features of the present disclosure relate to controlling access to resources by selectively processing requests stored in a task queue to prioritize certain requests over others, thereby preventing automated scripts from accessing the resources. Each resource may be provided by or associated with a client. The client may define one or more protocols stored in a database. A protocol may be associated with user records stored in or represented by a data source. For example, a protocol may be a protocol indicating a client's preference for providing access to a resource to users who are associated with user records stored in a certain client-defined or client-identified data source. Executing a protocol may include modifying existing user parameters of a set of users requesting access to the resource to bias towards a subset of users who are associated with user records stored in a client-identified data source. For example, a user parameter may be generated to represent a determined characteristic, classification, or segmentation of a user. A user parameter may be determined using data stored in one or more databases (internal or external to a primary load management system). The modified user parameters may then be used to order the set of users into queue positions of a digital queue. At a regular or irregular time interval, a group of queue positions of the digital queue may be granted access to an interface that enables a user to request access to the resource.

A resource (e.g., an event) may be associated with a plurality of access rights (e.g., event tickets). Each access right may grant access to a spatial area (e.g., a venue) associated with the resource for a defined period of time. A user may operate a user device to transmit a request to a primary load management system, which determines whether to assign access right(s) to users. The request originating from a user device may be for one or more access rights to a resource to be assigned to the user or user device. Assigning an access right to a user enables that user to access the spatial area associated with the resource during the defined period of time. The primary load management system may host an interface (e.g., an event data page) that enables users to request assignment of access rights. Before being provided with access to the interface, however, the user may be placed at a queue position of a digital queue (e.g., after logging into a platform operated by the primary load management system).

Certain aspects and features of the present disclosure relate to automatically determining which queue position to assign to each user who accesses the platform (e.g., intending to access the interface to transmit a request for assignment of one or more access rights). The queue positions of users may determine an ordering of users who are provided with access to the interface that enables a user to transmit requests for access rights. The queue positions may be determined by a normalization system that modifies user parameters by executing one or more protocols specific to the client associated with the resource. The one or more protocols may be configured to support an objective of the client. The protocols may be configured independently for each client, and thus, may be different across different clients. Accordingly, as a technical advantage, the assignment of queue positions of a digital queue to users who intend to request access rights to a resource may be determined using a different technique for each resource, thereby making it more difficult for automated scripts to obtain access rights over human users.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: generating, at a primary load management system, an interface configured to enable a user device to transmit a request for assignment of one or more access rights to a resource, and where the interface is accessible to user devices for which access to the interface has been granted by the primary load management system. The computer-implemented method also includes receiving, at the primary load management system, a communication from each of a plurality of user devices, and the communication from each user device including a request to access the interface. The computer-implemented method also includes retrieving a plurality of user parameters, each user parameter of the plurality of user parameters being associated with a user device from which a communication was received. The computer-implemented method also includes retrieving a protocol specific to the resource, the protocol being defined by a client associated with the resource, and the protocol being configured to determine an ordinal arrangement of user devices awaiting access to the interface. The computer-implemented method also includes executing the protocol, the execution of the protocol causing the plurality of user parameters to be normalized, where normalizing the plurality of user parameters includes modifying at least one user parameter of the plurality of user parameters to bias access to the interface towards a target group of user devices from amongst the plurality of user devices. The computer-implemented method also includes assigning a queue position of a digital queue to each of the plurality of user devices, the assignment of the queue positions being based on the plurality of normalized user parameters, and the digital queue representing the ordinal arrangement of user devices awaiting access to the interface. The computer-implemented method also includes selecting, at a regular or irregular interval, one or more user devices of the plurality of user devices, the selection being based on the ordinal arrangement of the plurality of user devices, and each user device of the one or more user devices being granted access to the interface. Other embodiments of this aspect include corresponding computer systems, apparatus, and computer programs recorded on one or more computer storage devices, each configured to perform the actions of the methods.

Implementations may include one or more of the following features. The computer-implemented method where biasing access to the interface towards the target group of user devices further includes: identifying which user devices of the plurality of user devices are also included in the target group of user devices. The computer-implemented method may also include for each user device included in both the plurality of user devices and the target group of user devices, modifying the user parameter corresponding to the user device so as to change a queue position associated with the user device, so that the user device is selected to access to the interface before a user device that is not included in the target group. The computer-implemented method further including: granting access to the interface for each user device included in the selected one or more user devices. The computer-implemented method may also include receiving, at the interface, a request for assignment of an access right to the resource, the request for assignment of the access right being received from a user device included in the selected one or more user devices. The computer-implemented method may also include in response to receiving the request for assignment, assigning the access right to the resource to the user device. The computer-implemented method where a user device of the plurality of user devices is not granted access to the interface until the user device is included in the selected one or more user devices. The computer-implemented method where each user parameter includes a value that represents a characteristic of the corresponding user device or a user associated with the corresponding user device. The computer-implemented method further including: generating a token for each user device of the plurality of user devices awaiting access to the interface, where the token is a unique value that validates a duration of time the user device awaited access to the interface in the digital queue. The computer-implemented method where each user device included in the target group of user devices is associated with an attribute determined by the client. Implementations of the described techniques may include hardware, a method or process, or computer software on a computer-accessible medium.

One general aspect includes a system, including: one or more processors; and a non-transitory computer-readable storage medium containing instructions which, when executed on the one or more processors, cause the one or more processors to perform operations including: generating, at a primary load management system, an interface configured to enable a user device to transmit a request for assignment of one or more access rights to a resource, and where the interface is accessible to user devices for which access to the interface has been granted by the primary load management system. The system also includes receiving, at the primary load management system, a communication from each of a plurality of user devices, and the communication from each user device including a request to access the interface. The system also includes retrieving a plurality of user parameters, each user parameter of the plurality of user parameters being associated with a user device from which a communication was received. The system also includes retrieving a protocol specific to the resource, the protocol being defined by a client associated with the resource, and the protocol being configured to determine an ordinal arrangement of user devices awaiting access to the interface. The system also includes executing the protocol, the execution of the protocol causing the plurality of user parameters to be normalized, where normalizing the plurality of user parameters includes modifying at least one user parameter of the plurality of user parameters to bias access to the interface towards a target group of user devices from amongst the plurality of user devices. The system also includes assigning a queue position of a digital queue to each of the plurality of user devices, the assignment of the queue positions being based on the plurality of normalized user parameters, and the digital queue representing the ordinal arrangement of user devices awaiting access to the interface. The system also includes selecting, at a regular or irregular interval, one or more user devices of the plurality of user devices, the selection being based on the ordinal arrangement of the plurality of user devices, and each user device of the one or more user devices being granted access to the interface. Other embodiments of this aspect include corresponding computer systems, apparatus, and computer programs recorded on one or more computer storage devices, each configured to perform the actions of the methods.

Implementations may include one or more of the following features. The system where the operation of biasing access to the interface towards the target group of user devices further includes: identifying which user devices of the plurality of user devices are also included in the target group of user devices. The system may also include for each user device included in both the plurality of user devices and the target group of user devices, modifying the user parameter corresponding to the user device so as to change a queue position associated with the user device, so that the user device is selected to access to the interface before a user device that is not included in the target group. The system where the operations further include: granting access to the interface for each user device included in the selected one or more user devices. The system may also include receiving, at the interface, a request for assignment of an access right to the resource, the request for assignment of the access right being received from a user device included in the selected one or more user devices. The system may also include in response to receiving the request for assignment, assigning the access right to the resource to the user device. The system where a user device of the plurality of user devices is not granted access to the interface until the user device is included in the selected one or more user devices. The system where each user parameter includes a value that represents a characteristic of the corresponding user device or a user associated with the corresponding user device. The system where the operations further include: generating a token for each user device of the plurality of user devices awaiting access to the interface, where the token is a unique value that validates a duration of time the user device awaited access to the interface in the digital queue. The system where each user device included in the target group of user devices is associated with an attribute determined by the client. Implementations of the described techniques may include hardware, a method or process, or computer software on a computer-accessible medium.

One general aspect includes a computer-program product tangibly embodied in a non-transitory machine-readable storage medium, including instructions configured to cause a processing apparatus to perform operations including: generating, at a primary load management system, an interface configured to enable a user device to transmit a request for assignment of one or more access rights to a resource, and where the interface is accessible to user devices for which access to the interface has been granted by the primary load management system. The computer-program product also includes receiving, at the primary load management system, a communication from each of a plurality of user devices, and the communication from each user device including a request to access the interface. The computer-program product also includes retrieving a plurality of user parameters, each user parameter of the plurality of user parameters being associated with a user device from which a communication was received. The computer-program product also includes retrieving a protocol specific to the resource, the protocol being defined by a client associated with the resource, and the protocol being configured to determine an ordinal arrangement of user devices awaiting access to the interface. The computer-program product also includes executing the protocol, the execution of the protocol causing the plurality of user parameters to be normalized, where normalizing the plurality of user parameters includes modifying at least one user parameter of the plurality of user parameters to bias access to the interface towards a target group of user devices from amongst the plurality of user devices. The computer-program product also includes assigning a queue position of a digital queue to each of the plurality of user devices, the assignment of the queue positions being based on the plurality of normalized user parameters, and the digital queue representing the ordinal arrangement of user devices awaiting access to the interface. The computer-program product also includes selecting, at a regular or irregular interval, one or more user devices of the plurality of user devices, the selection being based on the ordinal arrangement of the plurality of user devices, and each user device of the one or more user devices being granted access to the interface. Other embodiments of this aspect include corresponding computer systems, apparatus, and computer programs recorded on one or more computer storage devices, each configured to perform the actions of the methods.

Implementations may include one or more of the following features. The non-transitory machine-readable storage medium where the operation of biasing access to the interface towards the target group of user devices further includes: identifying which user devices of the plurality of user devices are also included in the target group of user devices. The non-transitory machine-readable storage medium may also include for each user device included in both the plurality of user devices and the target group of user devices, modifying the user parameter corresponding to the user device so as to change a queue position associated with the user device, so that the user device is selected to access to the interface before a user device that is not included in the target group. The non-transitory machine-readable storage medium where the operations further include: granting access to the interface for each user device included in the selected one or more user devices. The non-transitory machine-readable storage medium may also include receiving, at the interface, a request for assignment of an access right to the resource, the request for assignment of the access right being received from a user device included in the selected one or more user devices. The non-transitory machine-readable storage medium may also include in response to receiving the request for assignment, assigning the access right to the resource to the user device. The non-transitory machine-readable storage medium where a user device of the plurality of user devices is not granted access to the interface until the user device is included in the selected one or more user devices. The non-transitory machine-readable storage medium where each user parameter includes a value that represents a characteristic of the corresponding user device or a user associated with the corresponding user device. The non-transitory machine-readable storage medium where the operations further include: generating a token for each user device of the plurality of user devices awaiting access to the interface, where the token is a unique value that validates a duration of time the user device awaited access to the interface in the digital queue. Implementations of the described techniques may include hardware, a method or process, or computer software on a computer-accessible medium.

BRIEF DESCRIPTION OF THE DRAWINGS

The specification makes reference to the following appended figures, in which use of like reference numerals in different figures is intended to illustrate like or analogous components.

DETAILED DESCRIPTION

The illustrative examples described herein are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

Figure 1:
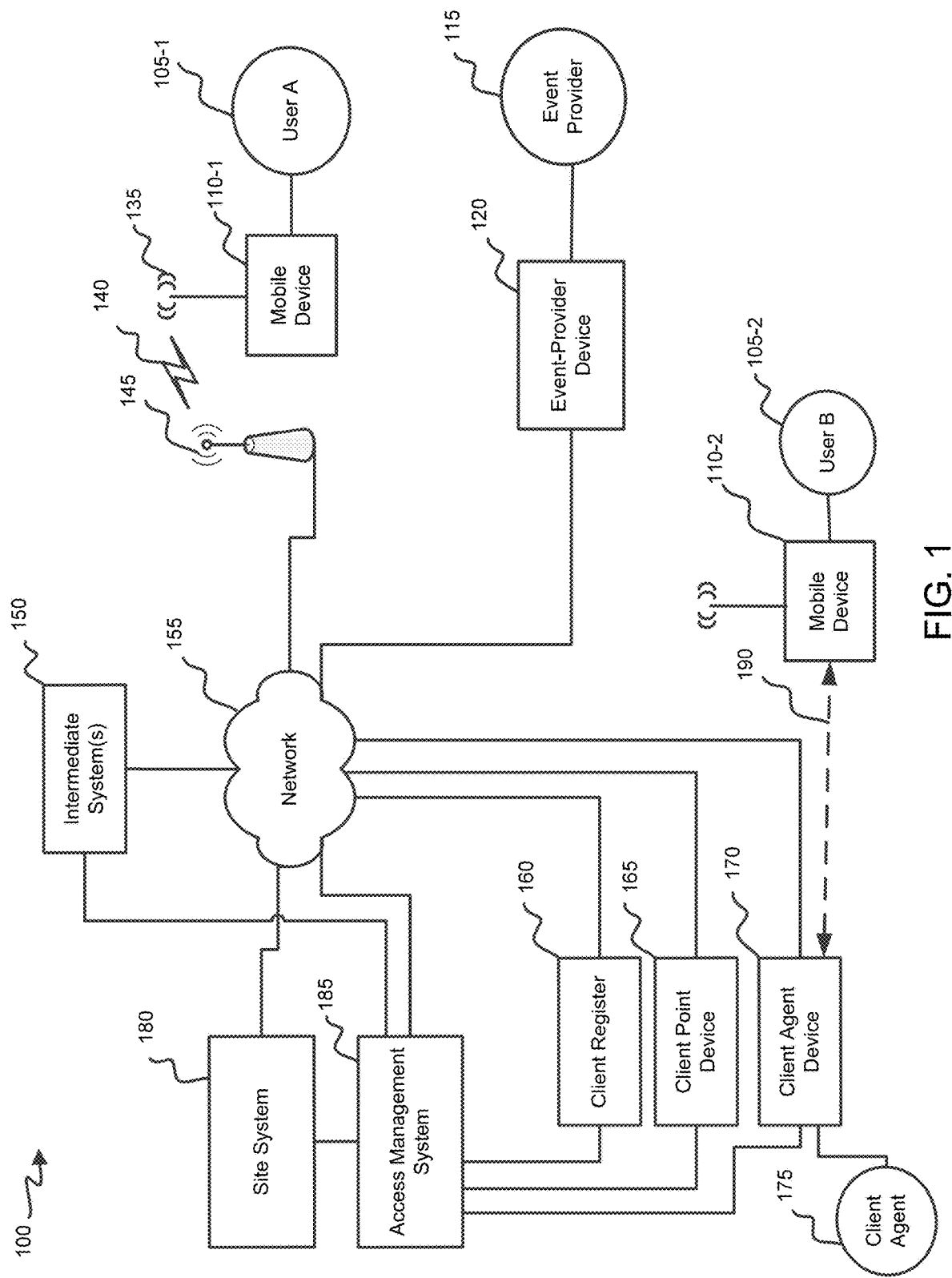
FIG. 1 depicts a block diagram of an embodiment of a resource access-facilitating interaction system.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as an entity or an entity operating a spatial region. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a spatial region of the resource (e.g., venue) during a time period for which the resource is accessible (e.g., event time). Mobile device 110-2 may directly interact with a client device (e.g., client agent device 170, client register 160 or client point device 165), which is also located at the spatial region during the time period in which the resource is accessible using access rights. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
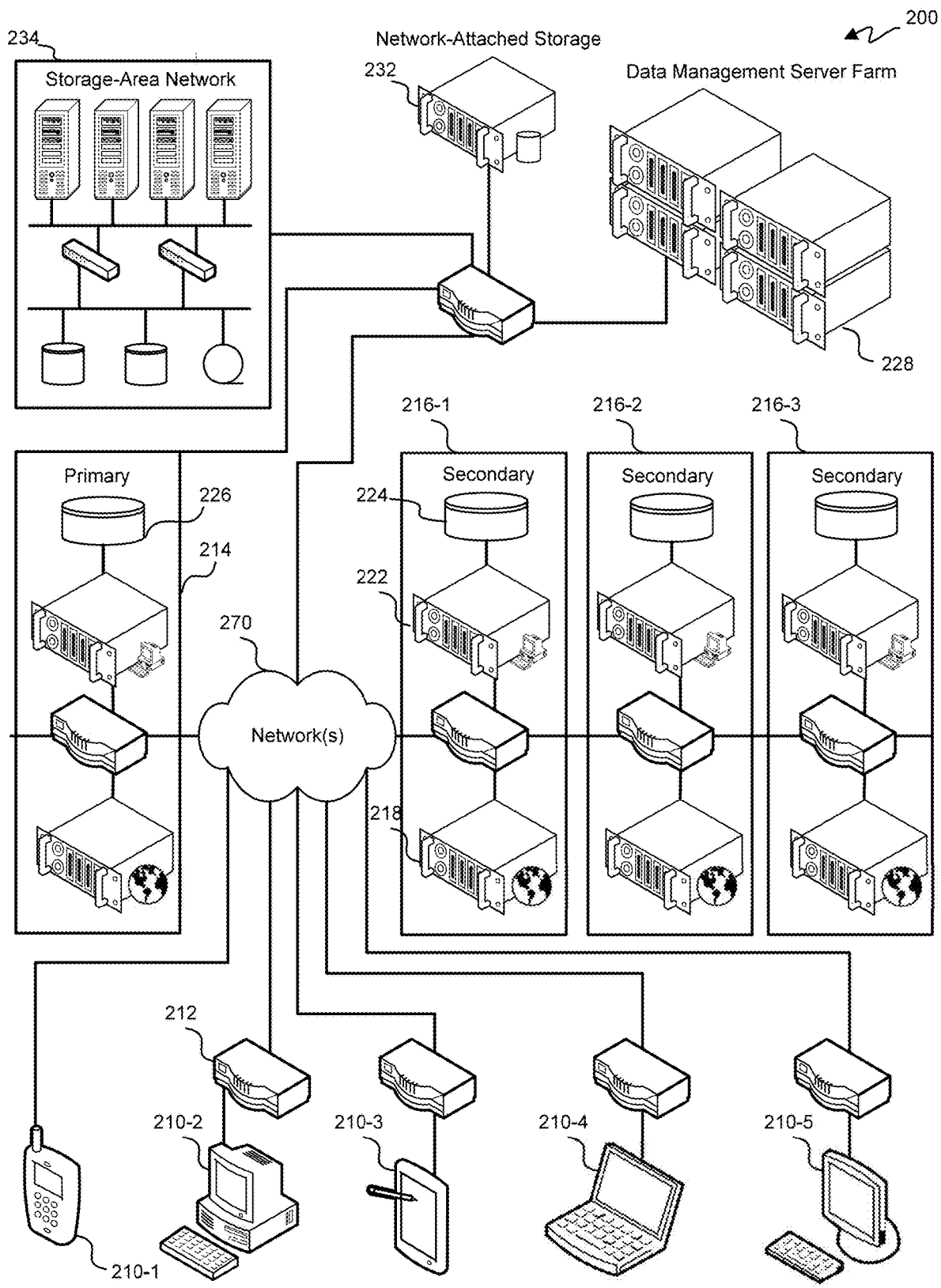
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of a profile, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a protocol can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
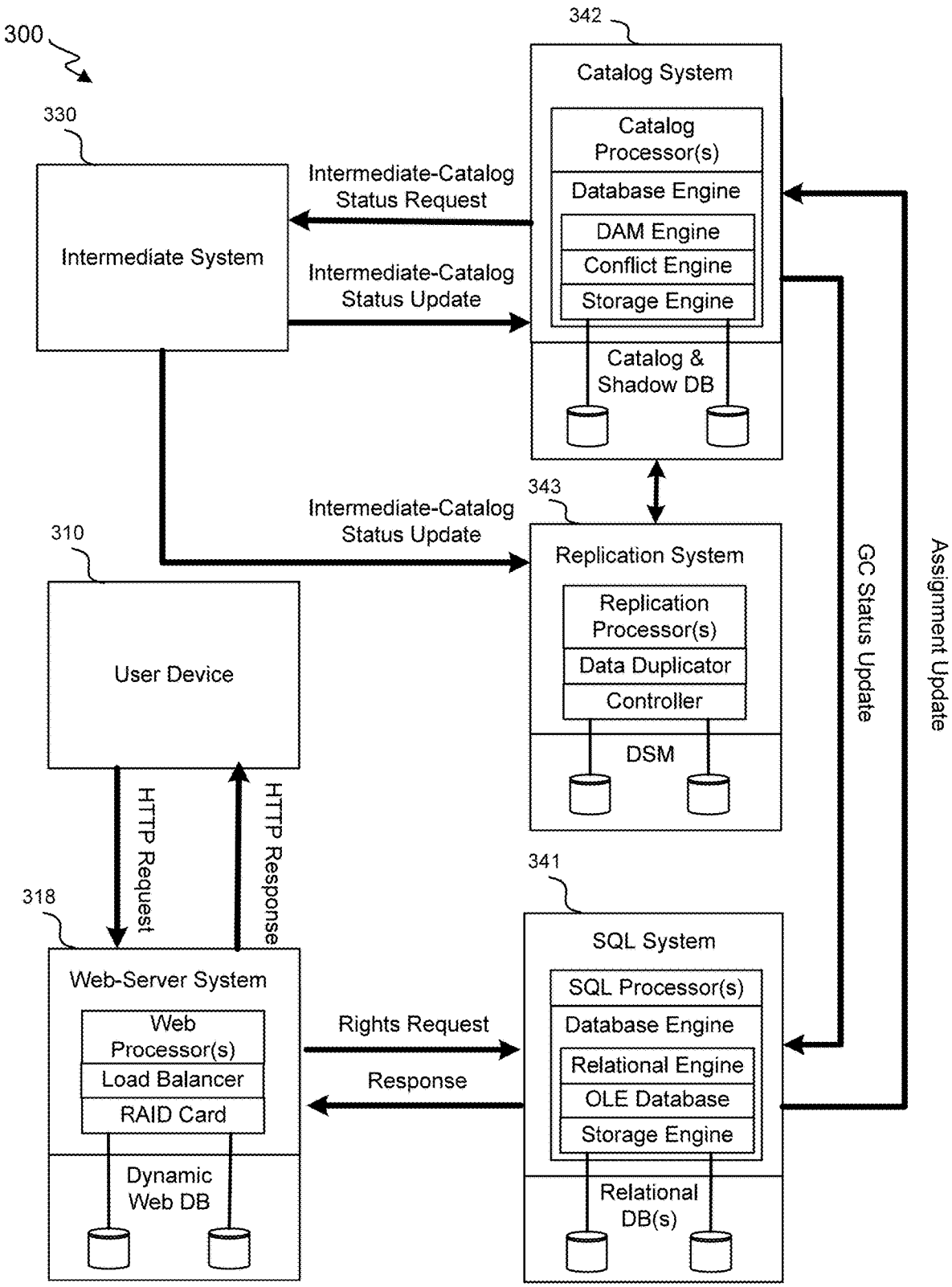
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user profile data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, profile and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information).

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of data-store queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement protocols indicating how conflicts are to be handled. For example, catalog system 342 may receive multiple requests within a time period requesting an assignment authorization (or a hold) for a particular access right. A protocol may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic webpages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
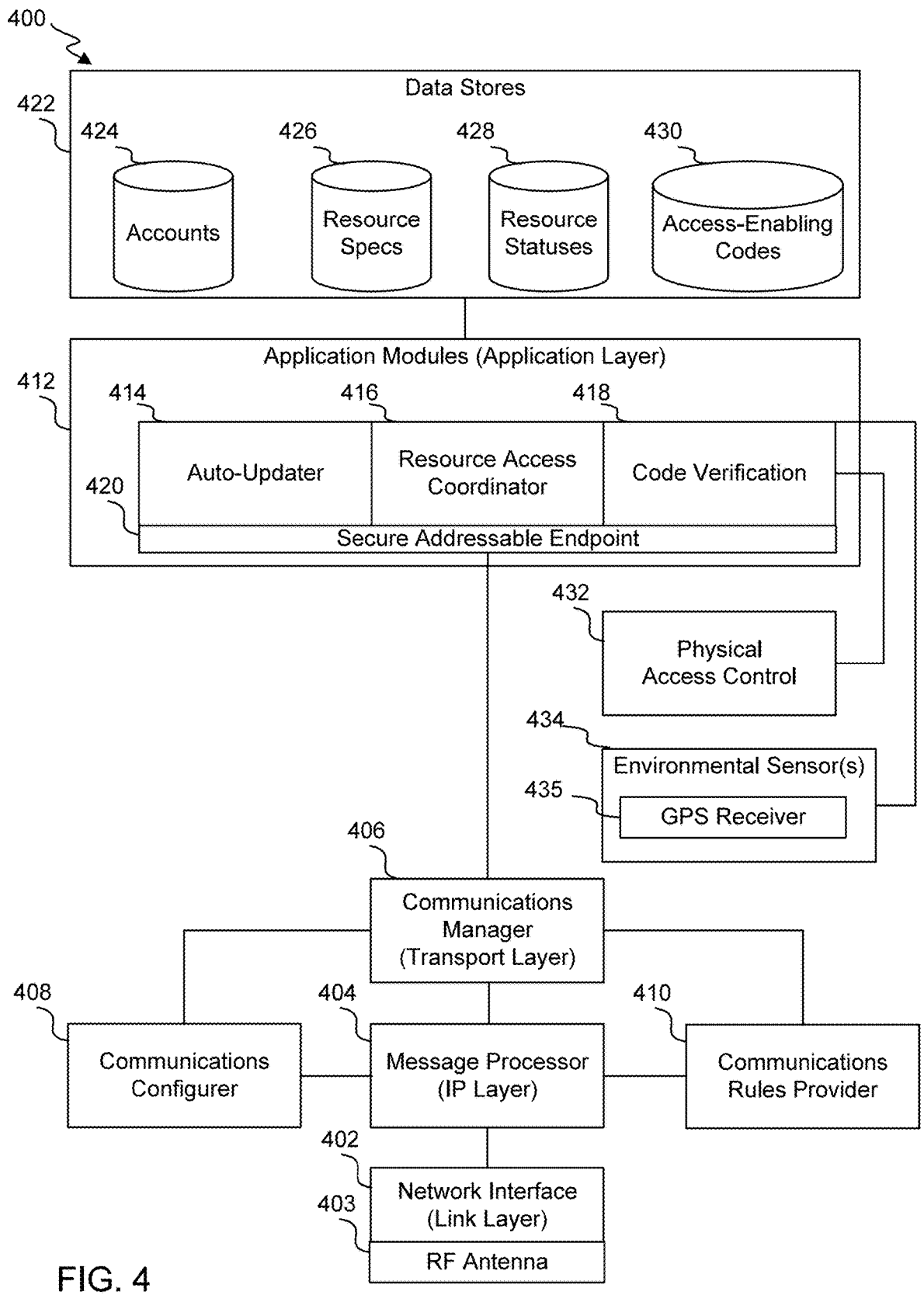
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource. As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting a check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator)

can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as a profile data store 424, resource specification data store 426, resource status data store 428 and/or access-enabling code data store 430.

Profile data store 424 can store data for entities, such as administrators, intermediate-system agents and/or users. The profile data can include login information (e.g., username and password), identifying information (e.g., name, residential address, phone number, email address, age and/or gender), professional information (e.g., occupation, affiliation and/or professional position), and preferences (e.g., regarding resource types, entities, access right locations, and/or resource types). The profile data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a resource entity, and/or a spatial region of the resource. Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, automatically and/or tentatively assigned or was assigned a resource. In some instances, status information can indicate that a resource is being held or automatically and/or tentatively assigned and may identify an entity associated with the hold and/or a time at which the hold or reservation will be enabled to be queried.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for access rights to a particular resource can be unique relative to each other. In some instances, at least part of a code identifies a resource or specification of a resource.

One or more of data stores 424, 426, 428, and 430 can be a relational data store, such that elements in one data store can be referenced within another data store. For example, resource status data store 428 can associate an identifier of a particular access right with an identifier of a particular entity. Additional information about the entity can then be retrieved by looking up the entity identifier in profile data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
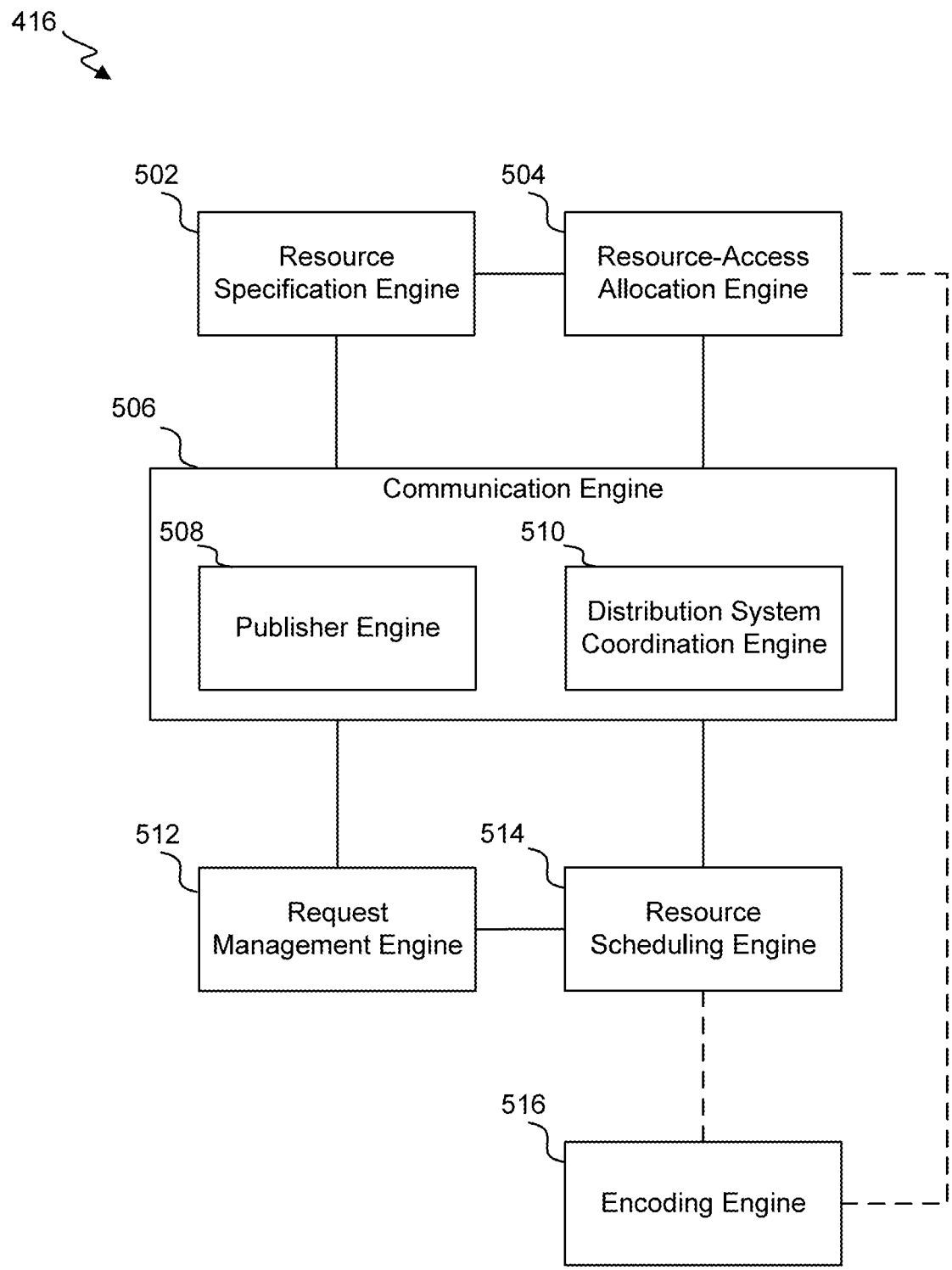
FIG. 5 illustrates example components of resource access coordinator module.

FIG. 5 illustrates example components of resource access coordinator module 416 that may operate, at least in part, at an access management system (e.g., access management system) according to an embodiment of the present disclosure. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or spatial region) of the resource. A specification can also or alternatively include one or more parties associated with the resource. Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on one or more steps of an assignment process or authorization thereof, an allocated access right can be initially unassociated with particular entities (e.g., users). For example, an allocated right can correspond to one or more access characteristics, such as an processor identifier, a usage time, a memory allocation, and/or a geographic location. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for Section 1 may be provided for a first intermediate system to assign, and access rights for Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information, and/or user device information (e.g., type of device, device identifier, and/or IP address).

When all required information has not been received, request management engine 512 can facilitate collection of the information (e.g., via an interface, app page or communication to an intermediate system). Request management engine 512 can also or alternatively execute or facilitate the execution of the assignment process, which includes one or more steps for completing an assignment of an access right to a user device or user profile. For example, publisher engine 508 may receive data inputted by the user via an interface, and request management engine 512 can request authorization to complete the assignment process. In some instances, request management engine 512 retrieves data from a user profile. For example, publisher engine 508 may indicate that a request for an access right has been received while a user was logged into a particular profile. Request management engine 512 may then retrieve, for example, contact information, device information, and/or preferences information associated with the profile from profile data store 424.

In some instances, request management engine 512 prioritizes requests, such as requests for overlapping, similar or same access rights received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests, whether requests were associated with users having established profiles, and/or whether requests were associated with inputs indicative of a bot initiating the request (e.g., shorter inter-click intervals, failed CAPTCHA tests).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining user confirmation) and/or to change a status of the access right(s) to indicate that they have been assigned (e.g., immediately, upon completing an assignment process or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a code (e.g., a 1-dimensional or 2-dimensional code), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a physical manifestation of an access right may be a document with an access code, and a copy of this document may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in profile data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment and/or to an intermediate system facilitating the assignment and/or having transmitted a corresponding assignment request. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user profile, and code verification module 418 can determine whether the code-identified device or profile matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable manner so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
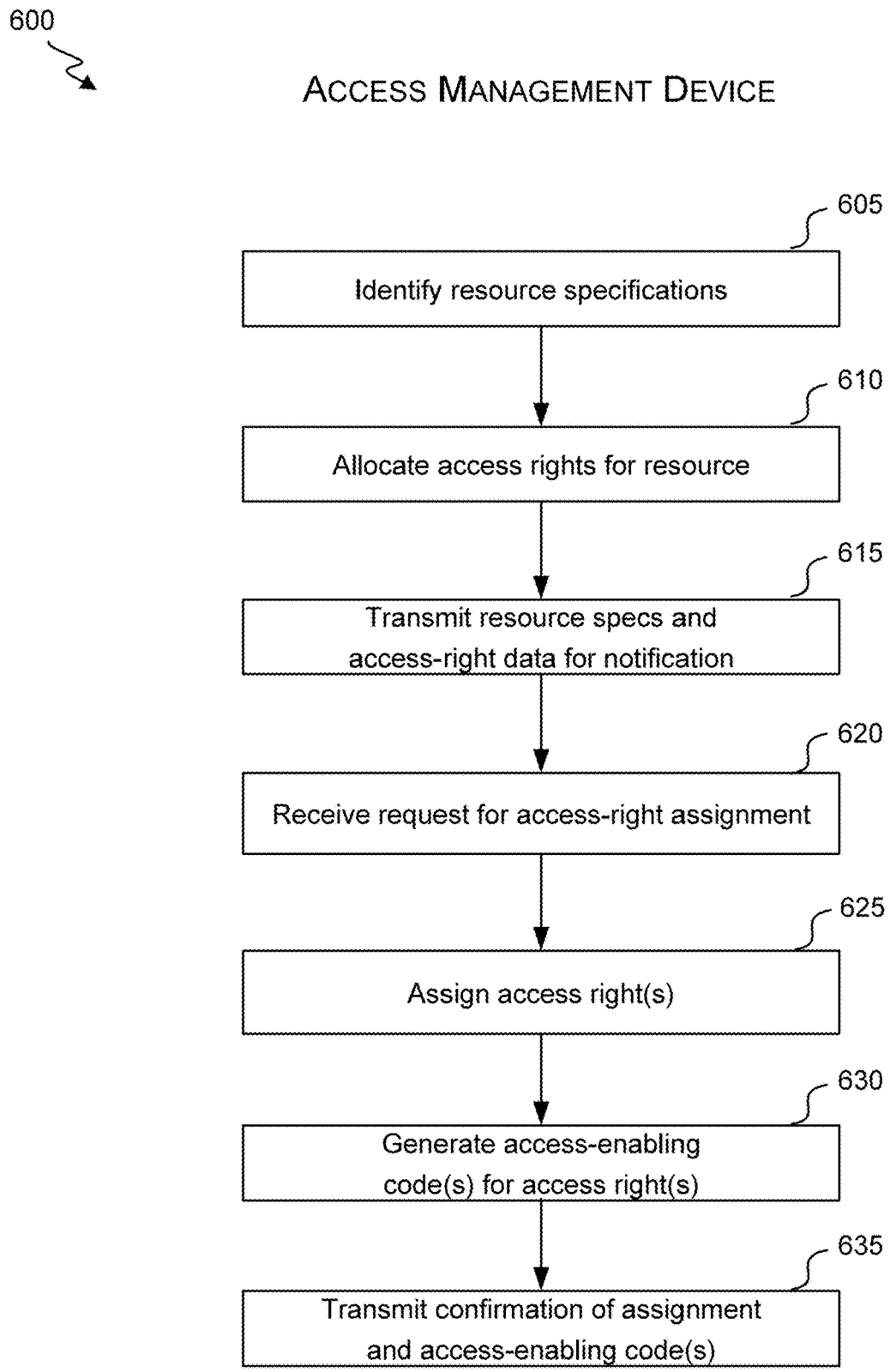
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether an assignment process has been completed. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
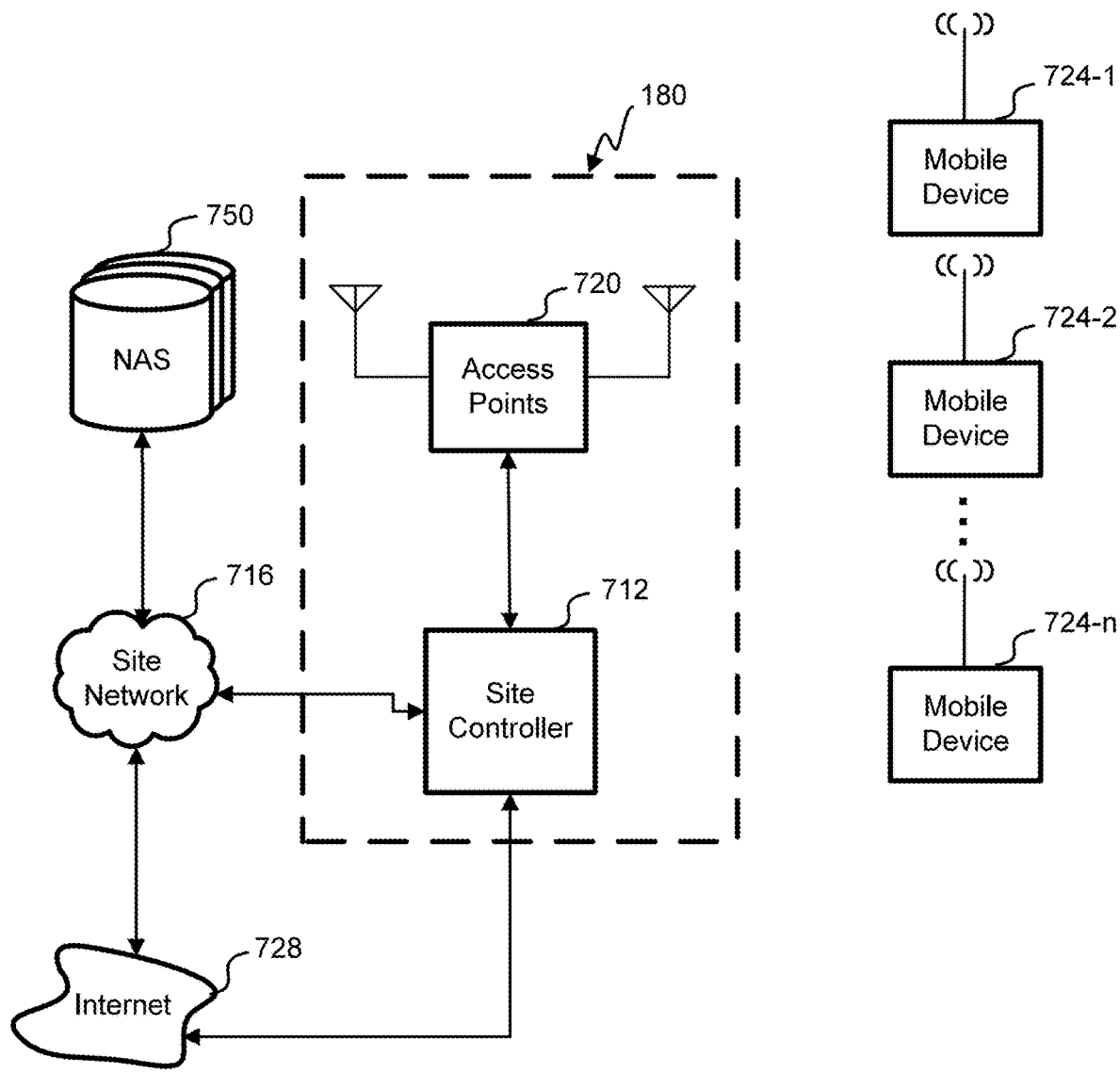
FIGS. 7A and 7B show embodiments of site systems in relations to mobile devices.

Referring to FIG. 7A, an embodiment of a site system 180 is shown in relation to mobile devices 724-n, Network Attached Storage (NAS) 750, site network 716 and the Internet 728. In some embodiments, for users located within the spatial region of the resource, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about the resource, videos, images, etc.) held by NAS 750. Additionally, as described herein, content can be gathered from users both before and during the time period the resource is accessible. By connecting to site network 716, mobile device 724 can send content for use by site system 180 or display content received from NAS 750.

Figure 7B:
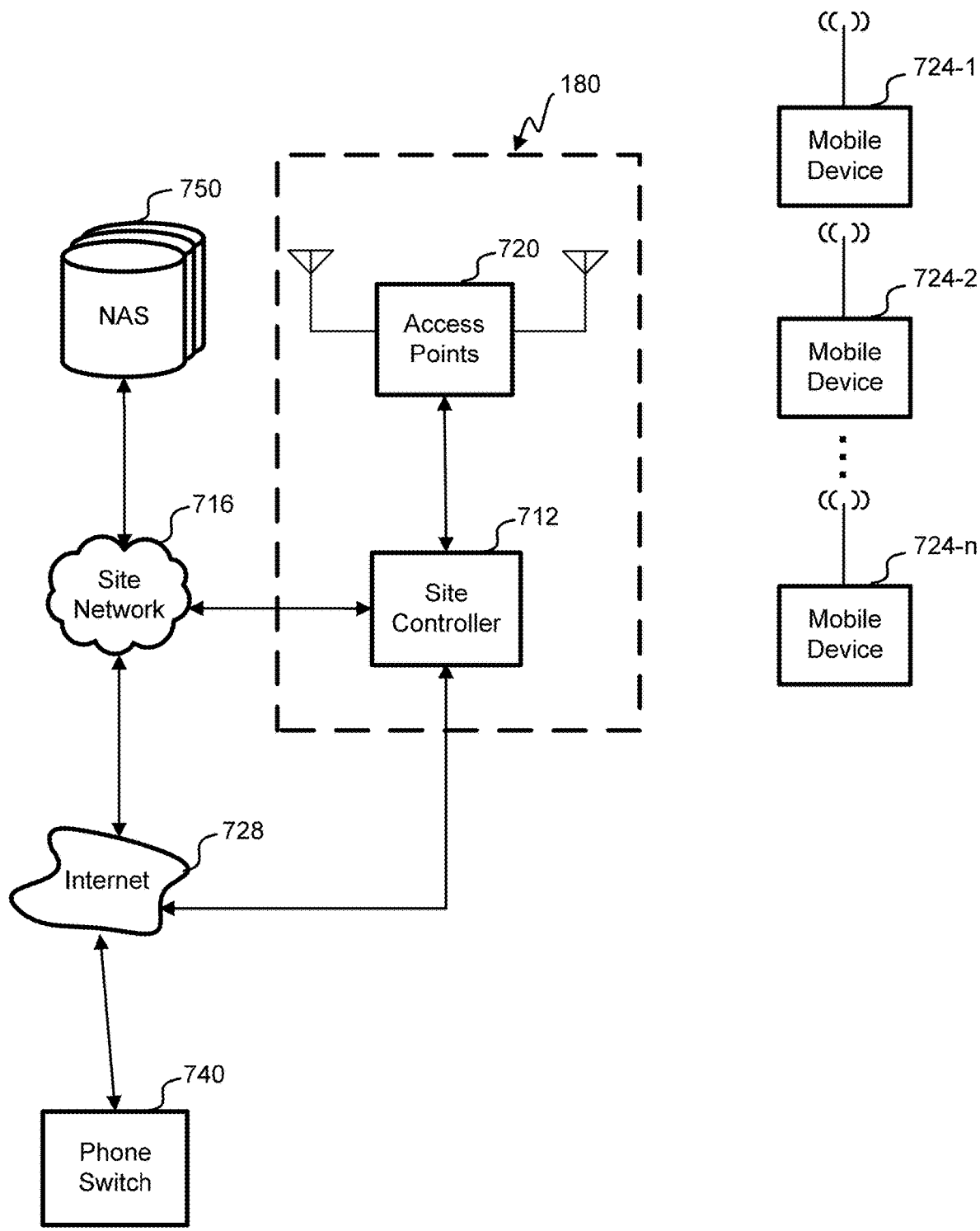

Referring to FIG. 7B, another embodiment of a site system 180 is shown in relation to mobile devices 724-n, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
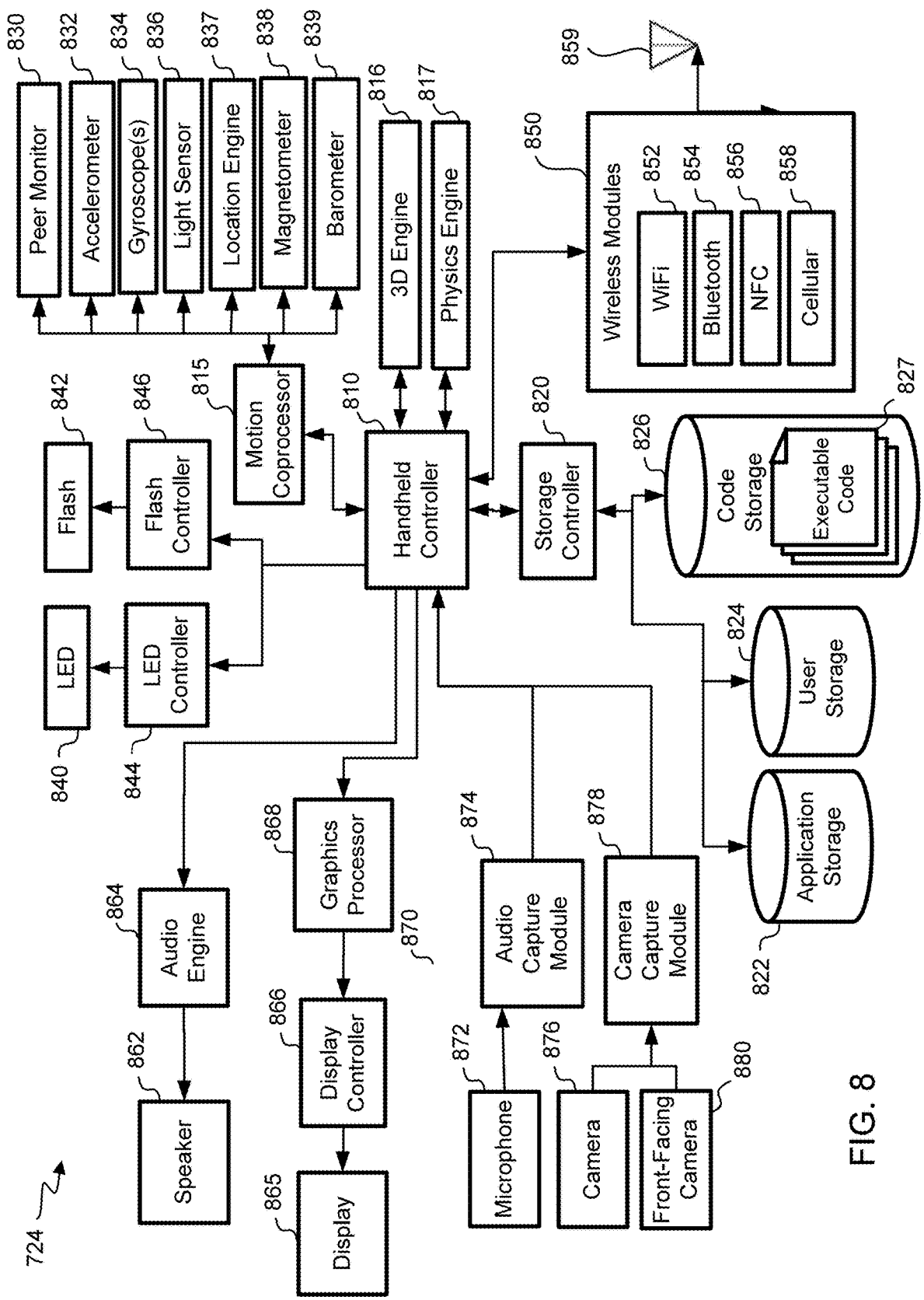
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
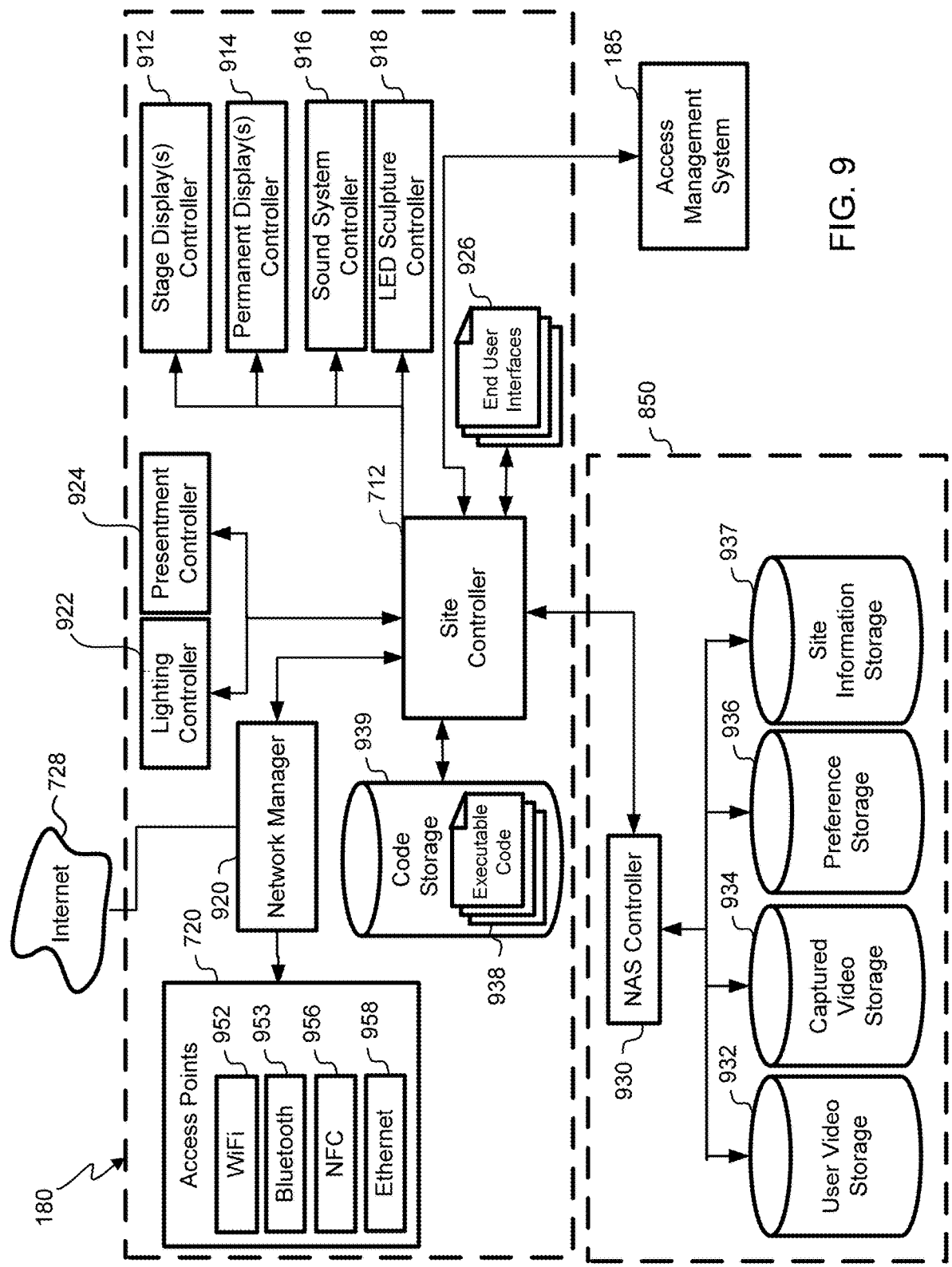
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of a spatial region associated with a resource. An access right grants access to the spatial region during a defined time period. A broad variety of features can be controlled by different embodiments, including: permanent lights (e.g., with lighting controller 922), lights (e.g., with presentment controller 924), display screens (e.g., with stage display(s) controller 912), permanent display screens (e.g., with permanent display(s) controller 914), and the sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., 3D models of site features and structure.

Figure 10A:
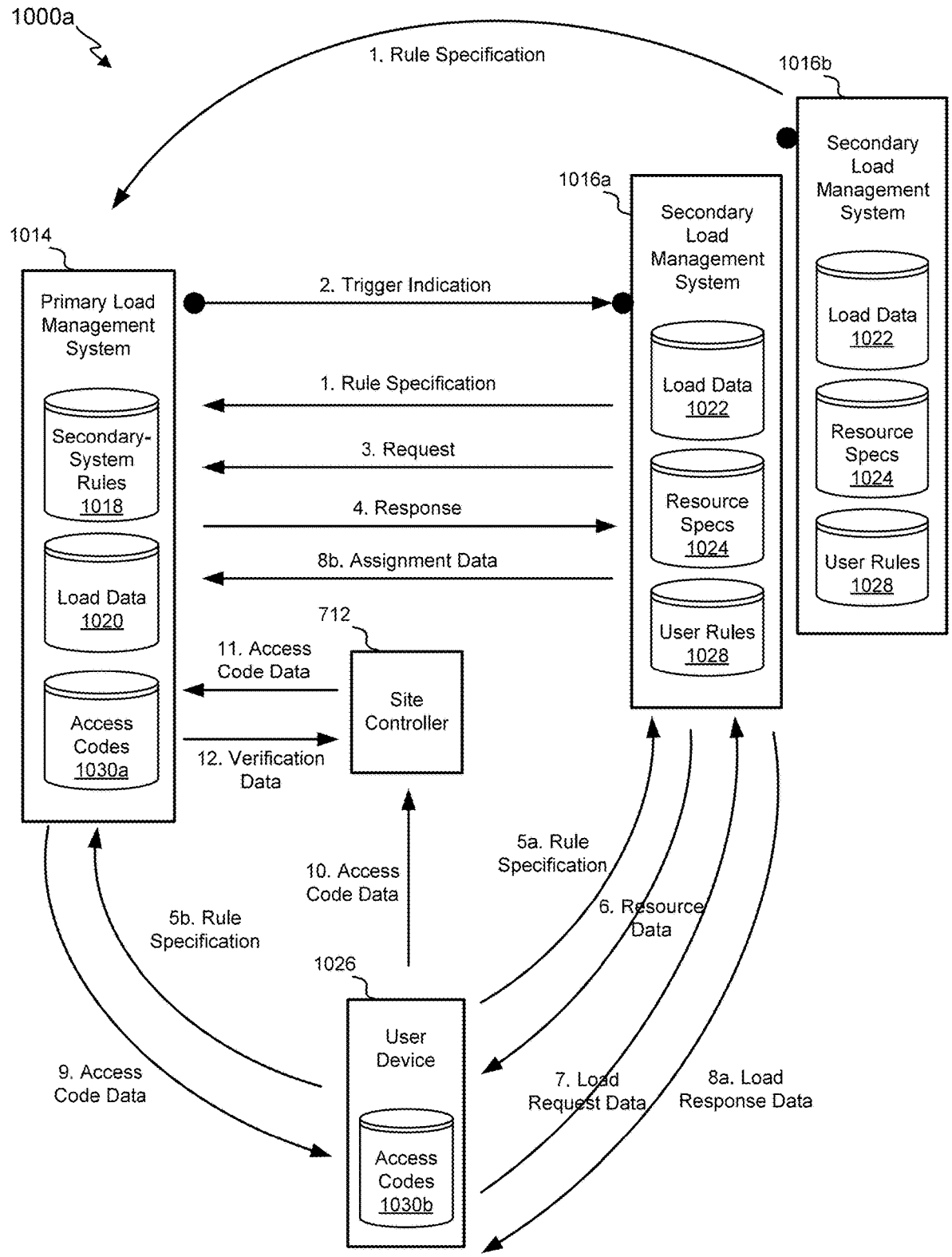
FIGS. 10A and 10B illustrate examples of communication exchanges involving primary and secondary load management systems.

Referring next to FIG. 10A, an example of a communication exchange 1000a involving primary load management system 1014 and each of a plurality of secondary load management systems 1016a, 1016b is shown. In some instances, secondary load management system 1016a is managed by an entity different than an entity that manages secondary load management system 1016b. Primary load management system 1014 may include and/or share properties with a primary assignment management system 214. Each of one or both of secondary load management system 1016a and 1016b may include or correspond to a secondary assignment system 216. Communications shown in FIG. 10A may be transmitted over one or more networks, such as network 270, the Internet and/or a short-range network.

In one instance, one of secondary load management system 1016a or 1016b is managed by a same entity as manages primary load management system 1014. In one instance, each of secondary load management system 1016 and 1016b is managed by an entity different than an entity managing primary load management system 1014. Primary load management system 1014 can include a system that, for example, manages a master access-right assignment data store, distributes access codes, performs verification data for access attempts, and so on. Secondary load management systems 1016a, 1016b can include systems that, for example, facilitate assignment of access codes to users. For example, secondary load management systems 1016a, 1016b can be configured to request allocation of access-right slots, which may result in a temporary or final allocation or assignment to the system, a hold on the access-right slots, and/or a distribution of data pertaining to the slot(s). Secondary load management systems 1016a, 1016b may then facilitate transmission of the access-right slots to one or more users and identify a user that has requested one or more particular access-right slots. The secondary load management system can then facilitate an assignment of the access-right slots by (for example) transmitting one or more access codes to the user device, identifying the user to primary load management system 1014 or updating assignment data.

Communication exchange 1000a begins with transmission of one or more rule specifications from each secondary load management system 1016a, 1016b to primary load management system 1014. The rule specification can include one or more request parameters identify parameters of a load requested for allocation. For example, a rule specification can include a specification pertaining to a size of a target load (e.g., corresponding to a number of access-right slots). The specification may include a particular number or a threshold. A rule specification can include a specification of a type of at least part of the load, such as one that identifies a resource or type of resource and/or one that identifies a characteristic of one or more access-right slots (e.g., a location). The specification may include a first allocation parameter that may identify a value for which access-right slots are being requested.

In some instances, a rule and/or request corresponds to a single resource, while in others, the rule and/or request corresponds to multiple resources. For example, a request may be for access-right results pertaining to each of three resources or to each resource available at a location in a season. Thus, in some instances, a rule specification identifies or is indicative of a number of resources. Resources may, but need not, be specifically identified in a rule specification, rule and/or request. For example, a rule specification may indicate that a defined number or range (e.g., 100-200) of access-right slots is requested for any given resource within a defined time period (e.g., year).

A rule specification can include an allocation parameter that identifies a parameter for allocating a load should it be allocated to the secondary load management system. To illustrate, secondary load management system 1016a, 1016b may be configured to receive allocations of access-right slots but to attempt to facilitate assignment of the access-right slots to users. Communication exchange 1000a can be configured so as to promote facilitated distribution to users upon allocation of access-right slots to a secondary load management system. Early provision of allocation parameters by a secondary load management system can promote such quick facilitated distribution.

For example, an allocation parameter can identify one or more communication channels (e.g., webpages, portals, information-distribution protocols, email addresses, etc.) for transmitting information pertaining to at least part of the load to each of one or more devices and/or an a second allocation parameter. This information may enable primary load management system 1014 to (for example) automatically provide information pertaining to allocated access-right slots via the communication channel(s) and/or to verify that allocation parameters comply with one or more primary-system rules (e.g., that may include an upper and/or lower threshold for an allocation parameter and/or limits on which communication channels may be used).

Primary load management system 1014 can define a rule for each secondary load management system 1016a, 1016b based on the rule specifications. The rules can be stored in a secondary system rules data store 1018.

Primary load management system 1014 can further include a load data store 1020. Load data store 1020 can include, for example, information pertaining to which access-right slots for a given resource are available and information pertaining to each of those slots. Load data store 1020 can further identify information pertaining to one or more defined loads, such as which access-right slots are corresponding to the load, to which secondary load management system a load has been allocated, whether an allocation includes any restrictions (e.g., time limits).

Primary load management system 1014 can assess whether a set of available access-right slots corresponds to request parameters identified in any secondary-system rules. For example, it can be determined whether a resource type corresponds to that specified in a request parameter, whether a quantity (and/or contiguous quantity) corresponds to that specified in a request parameter, whether a type of the access-right slots corresponds to that specified in a request parameter, and/or whether the quantity of access-right slots can be allocated for a value that corresponds to a first allocation parameter specified in a request parameter (e.g., the determination being based on defined values or thresholds associated with the access-right slots and/or a primary-system rule).

In some instances, it may be determined that request parameters identified in rules for multiple secondary load management system correspond to a same load or to a same at least part of a load. Primary load management system 1014 may include a switch, such as a content switch, that may evaluate a load, rules and/or systems to determine to which secondary load management system 1016 a load is to be allocated or identified. In these instances, the rules and/or systems may be prioritized to determine to which entity the load is to be allocated. The prioritization may depend on, for example, defined prioritizations of the systems, a time at which rule specifications were submitted (e.g., prioritizing early submission), a size parameter (e.g., prioritizing either lower or larger size requests), and/or first allocation parameters (e.g., prioritizing larger first allocation parameters).

It will be appreciated that, in various instances, a load may be generated in response to evaluation of a load (e.g., in an attempt to define a load that accords with request parameters), or a load may be first defined (e.g., based on which access-right slots remain available and/or distribution priorities of the primary load management system) and it is then determined which rule to which the load corresponds. In some instances, a primary-system rule as to which access-right slots are to be included in a load and/or a secondary-system rule as to which access-right slots are requested may depend on information, such as an environmental characterization corresponding to a resource, a throughput monitor and/or a discrepancy associated with a resource (e.g., a spread or line associated with a resource). In some instances, a primary-system rule and/or secondary-system rule may include a function that relates an environmental characteristic, throughput characteristic and/or discrepancy with an allocation parameter (e.g., such that larger discrepancies, poorer environmental characteristics and/or lower throughput prospects result in lower allocation parameters).

When it is determined that a load corresponds to a secondary-system rule (and/or any prioritization is performed), primary load management system can transmit a trigger indication to the associated secondary load management system 1016a. The trigger indication may identify characteristics of the load (e.g., a size, type of one or more access-right slots, resource, and/or allocation value). In some instances, the trigger indication may identify a rule and/or what specifications were defined in the triggered rule.

In some instances, communication exchange 1000a is configured so as to provide a secondary load management system 1016a a defined time period for transmitting a request responsive to a trigger indication. Access-right slots may, but need not, be placed on hold for the time period. Should a request not be received within the time period, primary load management system 1014 may transmit a same or different trigger indication to another secondary load management system with a rule corresponding to the load or may redefine a load so as to correspond with a rule of another secondary load management system and transmit a trigger indication accordingly. In some instances, a trigger indication is simultaneously transmitted to multiple secondary load management systems 1016, and a load may be allocated to a system that thereafter requests the load (e.g., in accordance with a first-responder or other secondary-system selection technique).

Secondary load management system 1016a can then transmit a request communication back to primary load management system that requests the load. Primary load management system 1014 can then transmit a response communication that confirms that the load is being allocated. In some instances, the response communication is transmitted subsequent to or in temporal proximity of a time at which a charge is issued or collected for the load. In some instances, then response communication includes further information about the load. For example, location of access-right slots in the load may be more precisely identified.

Secondary load management system 1016a can store data pertaining to the load in a load data store 1022. Load data store 1022 may further track statuses of access-right slots so as to be able to identify which access-right slots have been assigned to users. Secondary load management system 1016a can further manage and/or have access to a resource specification data store 1024 that can associate identifiers of various resources with corresponding information. The resource specifications may be, for example, included in a trigger-information or response communication from primary load management system 1014; identified via an external search (e.g., web crawl), and so on. Resource specifications may include, for example, a location and/or a date and time.

A user device 1026 can also transmit rule specifications to one or more of primary load management system 1014 and 1016a. The rule specifications may include request parameters, such as a size specification, type specification and/or assignment value (e.g., that may be precisely identified or a threshold). When rule specifications are transmitted and/or availed to secondary load management system 1016a, a corresponding user rule can be defined for the user device and/or user.

Secondary load management system 1016a can distribute data of a resource (or multiple resources) corresponding to the load allocated to the system. The resource data can include one or more resource specifications stored at resource specification data store 1024. The resource data may further include data associated with one or more access-right slots included in the load. For example, the resource data may identify a time and location of a resource and a location of each of one or more access-right slots. In some instances, the resource data further includes an allocation parameter, such as the second allocation parameter and/or one defined based thereupon included in a secondary-system rule specification or included in a rule associated with secondary load management system 1016a.

In some instances, secondary load management system 1016a controls the transmission of the resource data to one or more user devices 1026. In some instances, primary load management system 1014 facilitates the transmission. For example, the data may be identified in an interface provided, controlled and/or managed by secondary load management system 1016a, but primary load management system 1014 may have authorization to update the webpage, and thus primary load management system can update the secondary-system to include the resource data.

In some instances, resource data is selectively transmitted to user devices. For example, resource data may be transmitted only to the user devices associated with user rules corresponding with at least part of the load.

User device 1026 can request assignment of at least part of the load. The user request can identify, for example, one or more access-right slots (e.g., and/or one or more resources). Secondary load management system 1016a can evaluate the request and respond with load response data. Such a response may be conditioned (for example) on confirming completion of the assignment process. The load response data may (for example) indicate that the assignment has been accepted and/or include confirmation data. Upon such acceptance, secondary load management system 1016a can also transmit assignment data to primary load management system. The load data can include an identification of the user device (or corresponding information, such as a name, email, profile, device identifier or phone number of a corresponding user) and/or one or more access-right slots being assigned. Primary assignment management system can update an assignment data store and/or load data store 1020 to reflect the assignment.

Primary load management system 1014 can then retrieve access code data from an access code data store 1030 and transmit the access code data to user device 1026. The access code data can correspond to the one or more access rights being assigned to the user. The access code data can be transmitted (for example) immediately, at a defined time (e.g., relative to a time of a resource), or upon receiving a request (e.g., triggered by a user input or detecting that a user device has crossed a geofence corresponding to a resource).

User device 1026 can store the access code(s) in an access-code data store 1030b. Subsequently, user device 1026 can retrieve the access-code data and transmitting it to a site controller 712 (e.g., upon detecting the site controller, upon receiving a request from the site controller or in response to detecting a corresponding user input). Site controller 712 can include one located at a resource location. Site controller 712 can transmit the access-code data to primary load management system 1014, which can then determine whether the code is a valid code, has not been previously redeemed and/or corresponds to one or more characteristics (e.g., a resource associated with or identified by the site controller, a time, a device characteristic, etc.). A result of such determination(s) can be transmitted back to site controller 712 such that a user can then be granted or denied requested access to a resource.

It will be appreciated that one, more or all communications represented in communication exchange 1000a can be transmitted via (for example) a web site, a web portal, another portal, an email exchange, a message (e.g., SMS message) exchange, and/or an API.

It will be appreciated that part or all of a communication exchange can be performed in an automated or semi-automated manner. For example, one or more rules (e.g., secondary-system rules or user rules) can be defined so as to trigger automatic allocation or assignment upon detecting data that corresponds to request parameters in the rules. As another example, the one or more rules can be defined so as to trigger a notification communication to the user device or secondary load management system that includes an alert that the request parameters are satisfied and enable to user device or secondary load management system to transmit a request for allocation or assignment.

It will also be appreciated that various modifications to communication exchange 1000a are contemplated. For example, in one instance, secondary load management system 1016a may at least partly manage access codes. For example, one or more access codes corresponding to a load may be transmitted from primary load management system 1014 to secondary load management system 1016a as part of a response. Secondary load management system 1016a may then transmit select access codes to a user device 1026, and (in various instances) either primary load management system 1014 or secondary load management system 1016a may provide verification of the code to site controller 712.

Figure 10B:
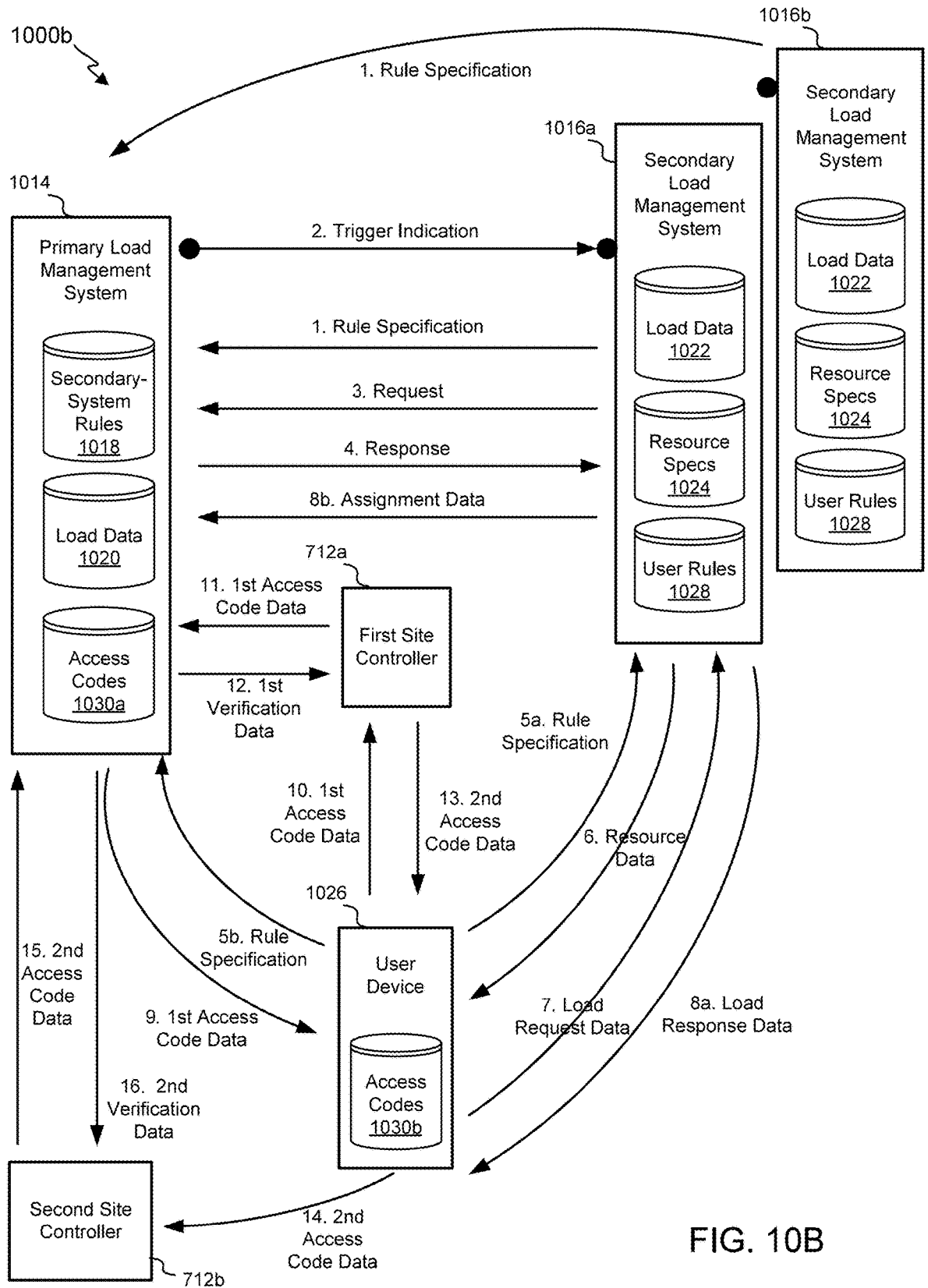

Referring next to FIG. 10B, another example of a communication exchange 1000b involving primary load management system 1014 and each of a plurality of secondary load management systems 1016a, 1016b is shown. In this instance, two different types of access code data are associated with an assignment.

As shown, in response to an initial assignment of an access-right slot, primary load management system 1014 transmits first access code data to user device 1026. The first access code data may include data representing that access to a resource has been authorized. However, in this instance, the first access code data may lack a precision of association that would associate the first access code data with one or more particular access characteristics. For example, the data may lack information that would identify a particular location within a resource area for which access is to be granted.

Subsequently (e.g., after a predefined time period, such as within a defined period from a resource time; and/or when a user device 1026 crosses a geofence corresponding to a resource, and/or when a user device 1026 receives input or a site-controller request indicating that access data is to be transmitted to a nearby site controller), user device 1026 may retrieve the first access code data and transmit it (e.g., via a short-range communication) to a first site controller 712a.

First site controller 712a may communicate with primary load management system 1014 to verify the data, in a manner similar to that described herein. Upon detecting that the first access code data has been verified, first site controller 712a can transmit second access code data to user device 1026. The second access code data have a precision of association that associates the data with one or more particular access characteristics. The second access code data may be, for example, generated at first site controller 712a or received from primary load management system (e.g., as part of the verification communication or as part of another communication). The particular access characteristics may be identified based on, for example, a technique described in U.S. application Ser. No. 14/063,929, filed on Oct. 25, 2013, which is hereby incorporated by reference in its entirety for all purposes. The particular access characteristics may be identified based on, for example, for which and/or how many access-right results first access code data had been previously verified and/or which and/or how many second access codes had been generated and/or transmitted.

The second access code data may indicate where access to a resource is authorized, and user device 1026 may thus move to a corresponding location. In some instance, a second site controller 712b is associated with the corresponding location. User device 1026 may then transmit the second access code data (e.g., when user device 1026 detects that it has crossed a geofence corresponding to the location and/or when user device 1026 receives input or a site-controller request indicating that access data is to be transmitted to a nearby site controller) to second site controller 712b. Second site controller 712b can determine whether the code is verified (e.g., valid, has not been previously used, and/or corresponds to the user device 1026 and/or location). The determination can include (for example) transmitting the second access code data to another device (e.g., primary load management system 1014, a local server, or another site controller, such as first site controller 712a) and receiving second verification data that indicates whether the second access code data is verified. The determination can, alternatively or additionally, include a local determination, which may be based (for example) on comparing the second access code data to data in a local access-code data store to determine whether there is a match and/or whether the second access code data (or corresponding access code data that is associated with same one or more particular characteristics) has been previously verified. The local access-code data store may be populated by second site controller 712b, for example, in response to communications from one or more other site controllers and/or primary load management system 1014 that identify second access code data that have been issued.

Referring to FIGS. 11-14, user devices accessing the primary load management system to request assignment of access rights to a resource may be initially assigned a queue position in a digital queue before being enabled to access an interface for creating and transmitting the requests for access rights. Certain aspects and features of the present disclosure relate to automatically determining an ordering of users by assigning the users to queue positions of a digital queue based on client-defined protocols. The client-defined protocols are different across resources, and thus, the ordering of users for a given request is difficult to predict. Further, the client-defined protocols are configured to modify user parameters associated with the users to bias towards users associated with a client-identified data source or a client-defined objective. Thus, automated scripts configured to mimic human users may be prevented from being positioned in favorable positions of digital queues. Biasing towards users targeted by the client may include, for each user device included in the queue and in the group of user devices targeted by the client, the corresponding user parameter of each of those user devices may be modified so as to change a queue position associated with the user device. The user device included in the group targeted by the client (e.g., members of a fan club) may be selected to access the interface before a user device that is not included in the targeted group.

The users who accessed the online platform may be assigned queue positions in the digital queue, according to certain implementations described herein. At a regular or irregular time interval, a group of queue positions in the digital queue may be automatically processed. Processing a queue position in the digital queue includes enabling the user device associated with the queue position to access an interface that allows users to create and transmit requests for access rights to a particular resource (e.g., an event data page that enables users to request event tickets). For example, when the queue position associated with a user is selected, the user device operated by the user may be granted access to the interface. Non-limiting examples of providing access to the interface may include transmitting a communication to the user device indicating that the user is enabled to access the interface and providing a link to the interface; a browser operating on the user device being automatically navigated to the interface; and a selectable element (e.g., a selectable button or hyperlink) that is unselected prior to the user's queue position being selected and is selectable when the user's queue position is selected for accessing the interface (e.g., and once the selectable element is selected, navigating the user to the interface).

In some implementations, the queue position of a user may be determined using a user parameter. A user parameter may be generated by the primary load management system to represent a likelihood that a specific user satisfies a target objective. Examples of target objective may include being a human user, being a human user who is a fan of a performer or team, not being an automated script, requesting access rights to a particular resource, and other suitable target objectives, which may be user defined. For example, U.S. Ser. No. 15/983,475, filed on May 18, 2018, the disclosure of which is incorporated herein by reference in its entirety for all purposes, describes a technique for generating a user parameter. It will be appreciated that any technique for generating a user parameter may be used, and thus, the present disclosure is not limited to any particular technique for generating a user parameter.

Certain aspects and features of the present disclosure include modifying the user parameters of some or all user requests stored in the digital queue based on one or more data sources determined or identified by a client associated with the digital queue. A normalization system provided by the primary load management system may receive or access the user parameters associated with the users in the digital queue. For example, a user parameter may be a score or value representing a likelihood that a particular user is a human user. Each queue position in the queue may store metadata identifying a user, such as a user identifier, a unique token value, and resource identifier, and so on. Further, the dynamic, protocol-based scoring of users provides a bot mitigation technique that identifies human users over automated scripts (e.g., bots) in a targeted and client-specific manner. For instance, because a user is ordered in a queue based on his or her client- or event-specific user parameter before being provided access to the interface, human users are provided with access to the interface earlier than detected bot users, thereby inhibiting bot traffic.

Certain embodiments of the present disclosure relate to a scoring normalization and priority service (e.g., referred to herein as a normalization system) that is configured to normalize user parameters (e.g., scores or values) from various internal or external systems. The normalization of user scores may be performed in light of a client or resource specific protocol. In some implementations, a user parameter may be modified according to the client or resource specific protocol.

To illustrate and only as a non-limiting example, a client may be hosting or otherwise associated with a specific resource. The client may define a protocol configured to prioritize users who are members of a client-associated group (e.g., a fan club of a performer). Executing the protocol may influence network traffic to the interface that enables users to request access rights to a resource associated with the client. The protocol may be defined with the objective of assigning access rights to human users over bot users (e.g., mimicking human users by executing automated scripts). The protocol may include executable code that, when executed, determines whether or not the user requesting an access right to the resource is a member of a predetermined group (e.g., a group preferred by or targeted by the client); determining whether or not the user is a human user based on an internal bot detection mechanisms (e.g., generating user parameters that are predictive of users being bots); and determining the age of the user account. The defined protocol may prioritize human users, for example, by adding an incremental value (e.g., 0.3 added) to the user parameter of a user in each of the following instances: (1) if that user is a member of the predetermined group, (2) if the user is predicted to be a human user based on the user parameter (e.g., the user parameter is above a certain threshold value corresponding to human users), or (3) if the user has had his or her user account for over five years. As another example, the normalization system may determine a normalization value to add to the user parameter corresponding to a user. The normalization value may be an incremental value that is determined based on the user's ordering in another data source. For instance, the protocol may include a preference for users who are ordered in a data source according to age of a user account. The incremental value that is added to the user parameter of a user may be determined based on the ordering of the user account age. In this example, the incremental value for the user with the oldest user account may be "1," whereas, the incremental value for the user with the newest user account may be "0.1." The incremental value may be added to the existing user parameter associated with the user, and the entire set of users may be reordered in the digital queue. In this case, the protocol may cause users with older user accounts to be prioritized in the digital queue. It will be appreciated that the present disclosure is not limited to adding or subtracting the incremental value from an existing user parameter. Instead, any technique for combining two or more values may be used with the implementations described herein.

Conversely, the normalization system can subtract a defined value (e.g., 0.3) from the user parameter of a user in each of the following instances: (1) if the user is not a member of the predetermined group, (2) if the user is not a human user based on the user parameter (e.g., the user parameter is below a threshold value corresponding to potential bot users), and (3) if the user has had his or her user account for less than a year. Alternatively, the objective of the protocol may be to assign access rights, regardless of whether of the access rights are assigned to human users or automated script users. In this case, the protocol may be different from the above protocol. For example, the protocol may include simply adding a predetermined value (e.g., 0.5) to user parameters of users who have logged in to the online platform operated by the primary load management system. The normalized user parameters (e.g., the predetermined value or the incremental value added to or subtracted from the user parameter) may be outputted by the normalization system for each user to a queuing system to place the corresponding user at a queue position of the digital queue in an order corresponding to the normalized user parameters. Advantageously, the normalized user parameter may represent a real-time assessment of whether the user satisfies an objective determined by the client (as defined by the protocol).

In some implementations, the user is scored using the normalization system without experiencing any front-end interface changes. The normalization performed by the normalization system may occur without the user recognizing that the normalization of user parameters is occurring. From the user's perspective, if the user logs in, the user waits until a selectable link or button is displayed on the webpage becomes selectable. For example, the selectable link or button may initially be unselectable while the user is placed in the digital queue. However, in some implementations, when the queue position of the user is ready to be processed, the user will automatically be provided with access to the interface for requesting access rights (e.g., the link or button may become selectable, and upon selection, the user device operated by the user may be navigated to the interface). In some implementations, the formerly unselectable link or button will automatically become selectable when the queue position of the user is ready to be processed. When the user selects the now selectable link or button, the user may be directed to the interface. The interface may be configured to enable the user to submit queries for available access rights to a given resource, for example, access rights that satisfy certain criteria, such as date or location. However, while the user is logged into his or her account of the online platform (which may or may not be required), the user may not be presented with any indication of the normalization system normalizing user parameters for that user from various data sources and of being placed in a digital queue based on that normalized user parameter.

Non-limiting examples of the signals received and processed by the normalization system to generate a normalized client- or resource-specific user parameter may include whether or not the fan has logged in to the online platform; the existing user parameter associated with the user (e.g., determined by techniques described in U.S. Ser. No. 15/983,475, filed on May 18, 2018, the disclosure of which is incorporated by reference herein in its entirety for all purposes); whether or not the user has accessed a gateway page before or after the access rights of a resource become available for assignment to users; whether or not the user is a member of a predetermined group; and any other suitable data signals or data sources.

In some implementations, the normalization system can normalize user parameters in real-time while the user is interacting with the online platform. For example, the user may access the webpage representing the online platform (which does not enable any creating or transmitting of requests for access rights). The webpage representing the online platform may provide users with an opportunity to log into the online platform or whichever system is associated with the resource. If the user does not log in, that user is still automatically scored using the normalization system (e.g., potentially after selecting a displayed link or button that triggers the normalization process in the back-end servers). In situations where the user does not log in, the primary load management system may access third-party data sources to identify the user or at least gain additional data representing the user. For example, the user's email address, IP address, location, or any other detectable information can be sent to a third-party data source to query whether the third-party data source has any additional information that corresponds to or matches the detected information. According to certain embodiments, the normalization system may reduce the user parameter or the combination of user parameters retrieved from various data sources. The user parameter reduction may be performed because the user has not logged in. Further, the user may be placed in a digital queue (without the interface visually indicating that the user is in a queue) based on the normalized user parameter outputted by the normalization system. However, if the user then chooses to log in, then the user's normalized user parameter may be updated, and thus, as a result, the user may be automatically repositioned in the digital queue (without the interface visually indicating that the fan is being repositioned in the digital queue).

In some implementations, the normalized user parameter generated by the normalization system may be encoded into a token using one or more hashing techniques. The token corresponding to the user can then be transmitted to the queuing system. For example, the queueing system can then evaluate the token to identify a user identifier representing the user and the normalized user parameter generated by the normalization system. Once these two items of data are extracted or decoded from the token (e.g., the user identifier and the corresponding normalized user parameter), the queueing system can then assign a queue position of a digital queue to the user's request for access rights. The queueing system can process the queue positions in any manner, including but not limited to in sequential order from highest normalized user parameter to lower normalized user parameter, in random order, in batches of any number (e.g., 100 queue positions corresponding to the next highest normalized user parameters are automatically provided access to the interface every five minutes or the number of queue positions that keeps a constant number of users accessing the interface).

In some implementations, when a user device accesses a gateway page of the online platform of the primary load management system, a unique token can be created automatically (e.g., in response to the user selecting a button displayed on the gateway page). Upon detecting that the button is selected, at the back-end, the normalization system can receive the user's user parameter from a database included in the primary load management system, and generate a normalized user parameter by executing the one or more protocols that correspond to the specific resource requested. The normalized user parameter can then be encoded into a token using one or more hashing techniques. The token can then be sent to the queueing system for ordering amongst the other normalized user parameters of other users and placement at a queue position in a digital queue according to the determined ordering. All the while, the user is not notified of the value of the normalized user parameter or the position of the queue placement, but rather is simply routed to a landing website that does not provide access to the interface until the user's queue position is selected and processed (e.g., is next in line in the digital queue). Advantageously, the creation of the token provides proof that the user has been assigned to a queue position before being granted access to the interface that enables the user to request access rights to resources. Hackers, for example, may attempt to access the interface by bypassing the digital queue. As a technical point of novelty or practical application, the hacker would not be granted access to the interface because the hacker does not have a corresponding token (which may have only been generated if the hacker had been assigned to a queue position of the digital queue).

In some implementations, the protocol defined by the client or defined for the specific resource may require additional information. For example, the client may provide a list of user features of users to the normalization system. The normalization system can perform network traffic modeling (originating from desktop browsers, mobile web browsers, or mobile native applications) based on the provided list of user features. The users on that list may be prioritized by the normalization system, which may increase user parameter values only for users who are included on the list provided by the client. For all other users, the normalization service may normalize user parameters by reducing the user parameter by a predetermined value. In some implementations, the normalization system can generate a single value based on the multiple input signals received, such as from internal or external user scoring systems or third-party data sources. Upon generating a single user parameter based on the received inputs, the normalization system can create a token or unique code that encodes the normalized user parameter and certain information about the user, such as user identifier. Advantageously, the creation of the token or unique code obfuscates the user's identity, and thus, the normalization service can normalize user parameters of users securely. Depending on the embodiment, the queuing system may or may not be a system internal to the normalization system itself.

It will be appreciated that the normalization of user parameters performed by the normalization system determines the order in which user devices are granted access to the interface. The interface enables user devices to create and transmit requests for assignment of access rights to a particular resource. Thus, the normalization system can cause the user devices that are granted access to the interface to be controlled to some extent. Without exercising control of the network traffic at the interface, the interface may fail to successfully facilitate the assignment of access rights to users. Accordingly, the control of which users are granted access to the interface and the order in which the users are granted access to the interface has a practical application in blocking bots from accessing servers, thereby managing network loads. Thus, certain implementations described herein improve the technology of managing network or Internet traffic load experienced at the interface by controlling access to the interface in a client-specific and automatic manner.

Advantageously, there is variability of the normalization of user parameters on a resource-by-resource basis. That is, the protocols that are executed to normalize the user parameters of users requesting access rights to one resource may be different from the protocols that are executed to normalize user parameters of users requesting access rights to another resource. Automated scripts cannot use the same techniques to bypass bot mitigation processes because the protocol changes per resource (e.g., per event) or per client (e.g., per venue manager or performer). Further, the normalization of user parameters is performed in real-time and without the user's knowledge, and thus, bots may not have sufficient notice to adapt to the different protocols for different resources. It will be appreciated that the protocol being different on a resource-by-resource or client-by-client basis may include different data sources. For example, for a first resource, the normalization system may prioritize users with user records included in data sources A and B, whereas, for a second resource, the normalization system may prioritize users with user records included in data sources C, F, and G.

It will be appreciated that the normalization system may combine any number of user parameters received from various data sources. For example, if the normalization system receives a first user parameter characterizing a user from a first data source and a second user parameter characterizing that user from a second data source, the normalization system can combine the first and second user parameters into a single normalized user parameter. Non-limiting examples of combining multiple user parameters together into a single normalized user parameter may include summing the user parameters and computing an average, generating a weighted combination of the multiple user parameters (where the weight may be defined by a protocol), any score-blending technique defined by the client, or any other suitable combination techniques.

In some implementations, the queueing system can perform continuous ordering when one or more queue positions are processed and new queue positions are added to the queue (based on new user requests from additional users). In some implementations, continuous ordering may include prioritizing the users with the highest normalized user parameters to the front of the digital queue at all times.

It will be appreciated that the methods and various embodiments described above can be implemented in conjunction with any of the methods or implementations described below.

Figure 11:
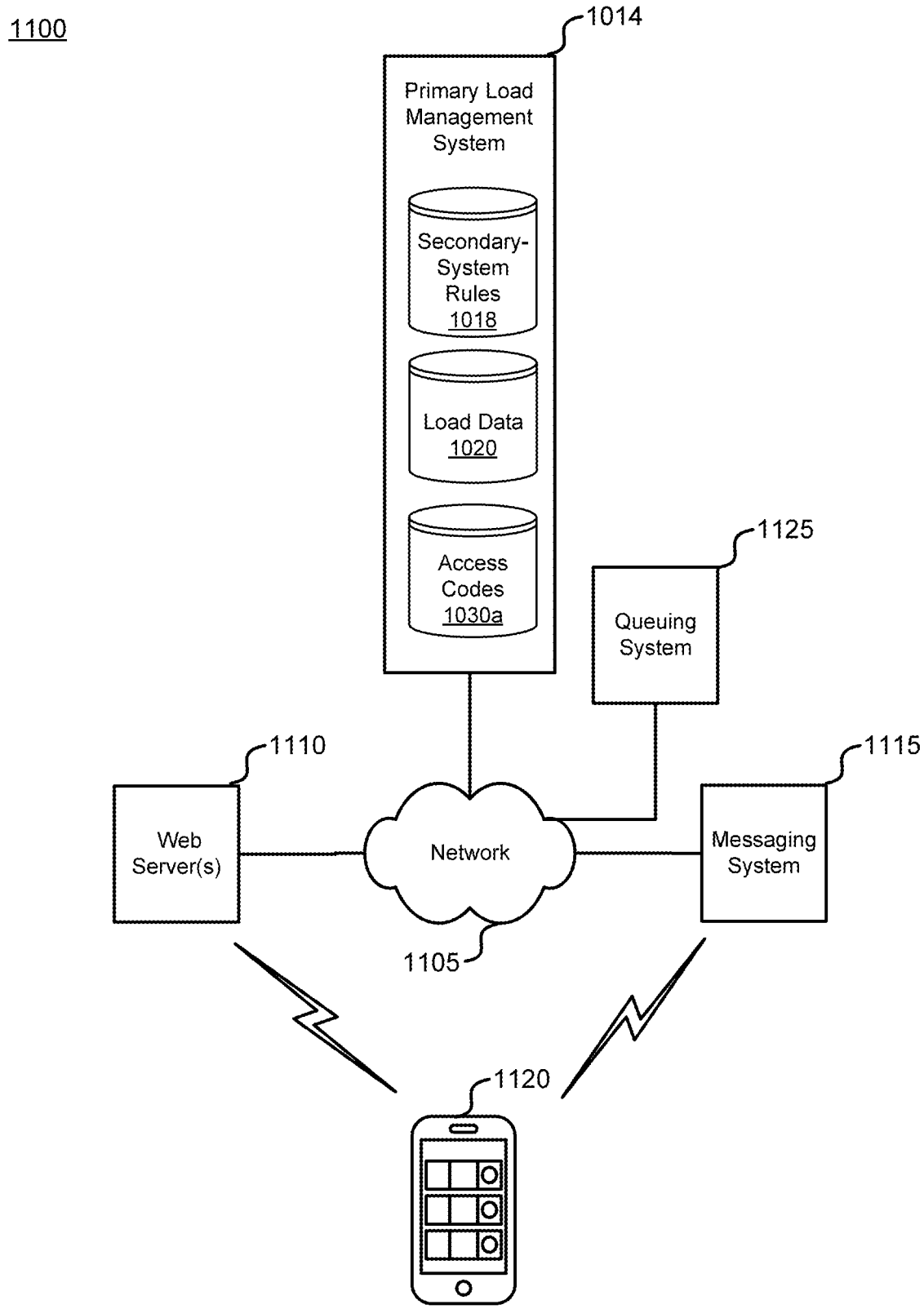
FIG. 11 is a block diagram illustrating a network environment for enabling access rights to be queried in a hierarchical manner based on resource-affinity parameters, according to some aspects of the present disclosure.

FIG. 11 is a block diagram illustrating a network environment for enabling queue positions to be assigned to users requesting access rights to a resource, such that the queue position of a user is based on normalized user parameters associated with that user. FIG. 11 illustrates network environment 1100, which includes primary load management system 1014, web server 1110, messaging system 1115 (e.g., an SMS provider), and mobile device 1120. Primary load management system 1014 may be configured to communicate with web server 1110 and messaging system 1115 through network 1105. Network 1105 may be any public and/or private network connected to the Internet.

Web server 1110 may include one or more servers configured to host one or more webpages associated with the primary load management system 1014. For example, web server 1110 may host a webpage that displays an interface configured to enable users to create and transmit requests for assignment of access rights to a resource. The requests may be transmitted to the primary load management system, which may be configured to determine whether or not to assign the access right(s) to the user. The determination of the assignment may be based on whether or not the user has completed an assignment condition (e.g., purchased the ticket). Web server 1110 may also facilitate the assignment process for requesting assignment of one or more access rights that are publicly available to be queried by user devices. Additionally, web server 1110 may host a webpage that enables users to log in to the online platform that is operated by the primary load management system 1014. For example, the webpage may be configured to receive login credentials from users to determine whether the users are authorized to access the online platform.

Messaging system 1115 can include one or more servers that facilitate communications between primary load management system 1014 and mobile devices. For example, messaging system 1115 can implement a messaging service, such as SMS or push notifications, to communicate with mobile devices (e.g., smartphones).

Mobile device 1120 can be any end user device that is configured to be operated by a user. Examples of mobile device 1120 can include smartphones, tablet devices, laptops, or any mobile computing device. It will be appreciated that non-portable devices may also be included in network environment 1100, and as such, while mobile device 1120 is portable, the present disclosure is not limited thereto. Mobile device 1120 may be operated by a user. The user may operate mobile device 1120 to access the one or more webpages hosted by web server 1110 in order to query for and/or request assignment of access rights to a resource.

Queuing system 1125 may include one or more servers configured to generate digital queues. Each digital queue may include a plurality of queue positions that arrange user identifiers, user requests, or token identifiers. For example, a user may be represented by a user identifier, a user request identifier, a session identifier, a token identifier, or any other suitable unique identifier. Whichever identifier is used, the value of the identifier may be stored at a queue position of a digital queue. For a given user identifier, the queueing system 1125 may evaluate the normalized user parameter and assign a queue position to the corresponding user identifier based on the normalized user parameter and the normalized user parameters of other users.

Figure 12:
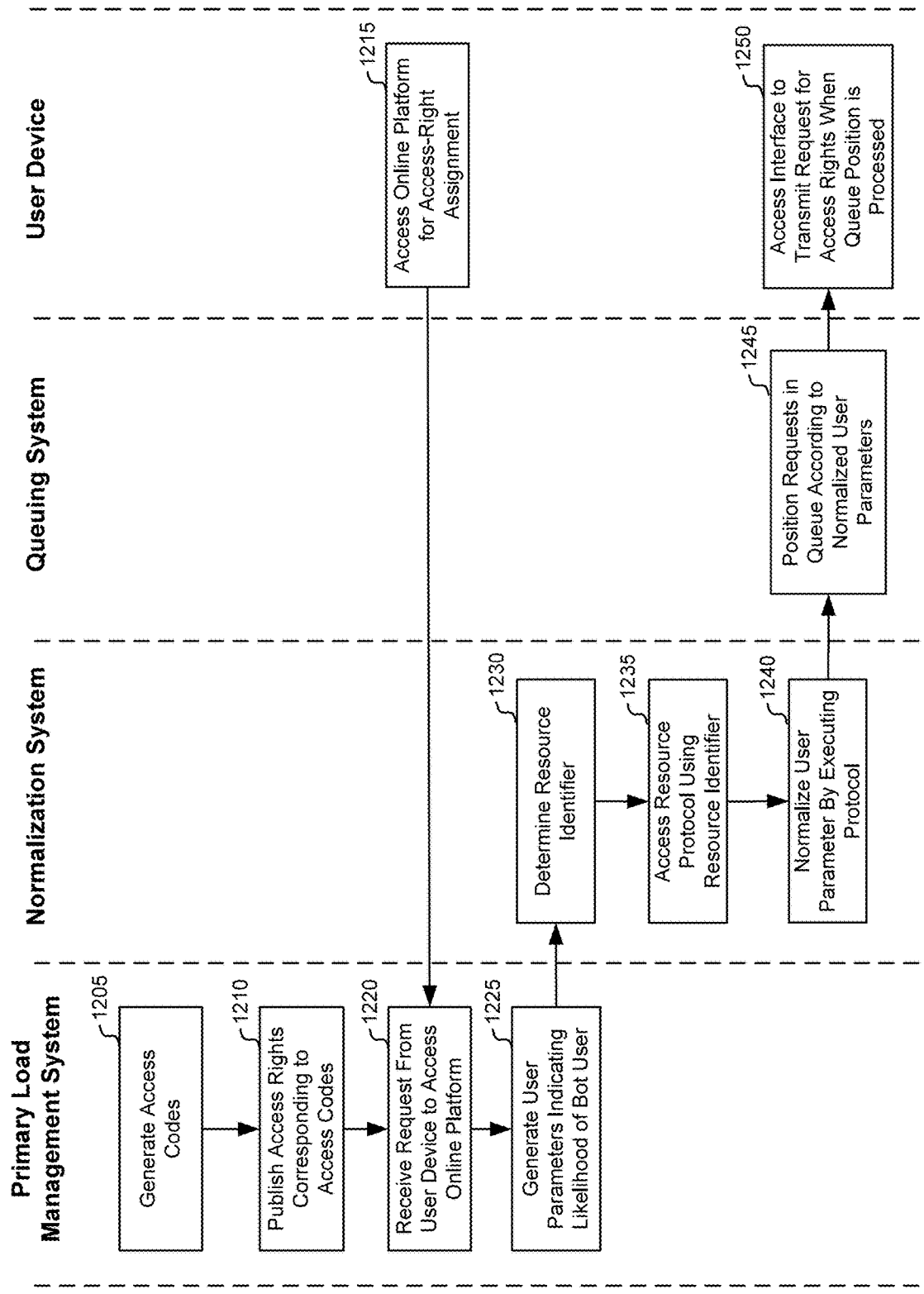
FIG. 12 is a swimlane diagram illustrating an example data flow of a network environment, according to some aspects of the present disclosure.

FIG. 12 is a swimlane diagram illustrating an example process flow 1200 of the network environment of FIG. 11. Process flow 1200 can include one or more communications between the primary load management system, the normalization system, the queuing system, and the user device (for example, mobile device 1120 as illustrated in FIG. 11). Process flow 1200 begins at block 1205 where the primary load management system generates unique access codes (representing unique access rights to a resource). At block 1210, the access rights that correspond to the generated access codes are published to the interface and queriable though the interface. When the access rights are available or enabled to be queried by user devices, they become searchable using the interface. Further, when the access rights are available or enabled to be queried by user devices, the access rights are also available to be assigned to user devices requesting assignment of the access rights. For example, a particular user device can query for access rights that satisfy a certain constraint (e.g., a location of the access right or resource) using the interface, and then the user device can transmit a request that the access right(s) that result from the query be assigned to the user device. The user device may have to complete an assignment process to have the access right(s) assigned to the user device. However, when access rights are accessible for querying, the databases that store the access rights often experience durations of high load around the time when the access rights are initially available to be queried. At block 1215, a user device may access an online platform hosted by the primary load management system. For example, the user device may log into the online platform using login credentials.

At block 1220, the primary load management system may receive the request from the user device to access the online platform. For example, the request to access the online platform hosted by the primary load management system may include login credentials to authenticate the user. If the login credentials are valid, then process flow 1200 proceeds to block 1225. If the login credentials are not valid, then the process flow 1200 ends.

At block 1225, the primary load management system can generate or access a user parameter associated with the user or user device logged into the online platform. The online platform may be a cloud-based application that is accessible to end users and that is configured to enable users to request the assignment of access rights to resources. The online platform may generate or access a user parameter for each user that logs into the online platform. The user parameters of users may be stored in a data store associated with the primary load management system. If the user logging in is a new user (e.g., a user parameter has not previously been generated for that user), then the primary load management system may generate a new user parameter for that user. Any technique may be used to generate a user parameter, which is a value that represents a characteristic of a user, for example, U.S. Ser. No. 15/983,475, filed on May 18, 2018, the disclosure of which is incorporated herein by reference in its entirety for all purposes, describes a technique for generating a user parameter (also referred to as a resource-affinity parameter). Each user may be assigned to a queue position of a digital queue according to the user parameter associated with the user, such that the digital queue positions the users in an ordinal arrangement. It will be appreciated that any user scoring technique may be used with the implementations described herein. That is, the protocol(s) defined by a client may be executed to normalize user parameters, regardless of how the user parameters are generated or computed.

At block 1230, the normalization system may receive the user parameter for each user who logged into the online platform. The normalization system may then identify a resource identifier associated with the user's request to log into the online platform. For example, after the user device accesses the primary load management system to log in to the online platform, the user device may transmit to the primary load management system an indication of which resource the user device seeks to access. User input may be received at a webpage hosted by the primary load management system. The user input may correspond to a selection or an identification of a resource. The primary load management system may then identify a resource identifier that uniquely identifies the resource selected or identified by the user. As another example, the user device may access a login page specifically associated with the resource. Upon logging in to the login page, the primary load management system may detect that the user device has logged in to the login page associated with the resource, and in response, may append a resource identifier to a session identifier, user identifier, or token identifier that uniquely identifies the user's session. The normalization system, at block 1230, may detect the appended resource identifier.

At block 1235, the normalization system may access or otherwise identify or determine one or more protocols of a protocol set using the resource identifier. The one or more protocols of the protocol set may be stored in a database accessible to the primary load management system and the normalization system. The protocol set may be stored in association with the corresponding resource identifier so as to be queriable by the normalization system. In some implementations, the normalization system is included in the primary load management system. In other implementations, the normalization system may be external to the primary load management system.

At block 1240, the normalization system may execute the one or more protocols of the protocol set that corresponds to the resource identifier. Executing the one or more protocols of the protocol set (which is defined by or for the specific client associated with the resource) may cause the user parameter associated with the user to be normalized (e.g., modified in a manner that is specific to an objective of the client). Further, the one or more protocols may be executed in association with each queue position of the digital queue. Some or all of the user parameters associated with the queue positions of the digital queue may be modified according to the protocol set. As a non-limiting example, a protocol may indicate that of a set of users who requested access to a resource, the subset of users who are included in a predetermined group, may be prioritized in the digital queue. Prioritizing the subset of users may include modifying the user parameters of each user of the subset of users to improve the likelihood of the user being granted access to the interface before other users (e.g., users not included in the subset). In this case, the protocol is associated with an objective of the client, such as to provide earlier access to the interface to the users who are members of the predetermined group.

At block 1245, the user requests (e.g., the requests by the user to access the interface that enables the user to request assignment of access rights to the resource) may be positioned in a digital queue according to the normalized user parameter of each user. At block 1250, at a regular or irregular time interval, a group of queue positions of the digital queue may be granted access to the interface. For example, at block 1250, the user device is granted access to the interface and is then enabled to create and transmit requests for one or more access rights to the resource to be assigned to the user.

Figure 13:
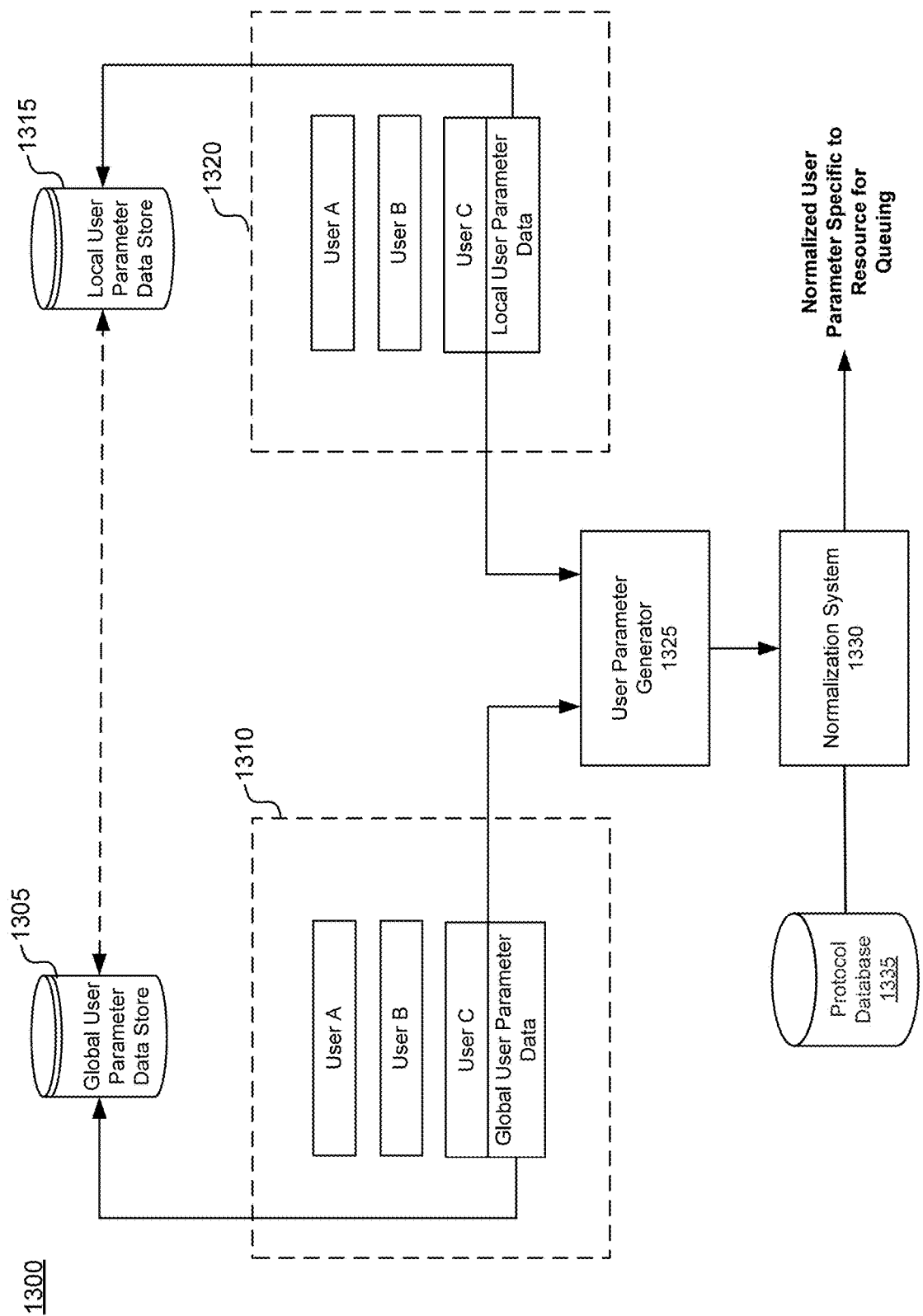
FIG. 13 is a block diagram illustrating a network environment for generating user parameters, according to some aspects of the present disclosure.

FIG. 13 is a block diagram illustrating an example of a network environment 1300 for generating user parameters for users. Network environment 1300 can include global user parameter data store 1305 and local user parameter data store 1315. Global user parameter data store 1305 can store data structure 1310, which includes the global user parameters for one or more users (e.g., User A, User B, User C, and so on). Local user parameter data store 1315 can store data structure 1320, which includes the local user parameters for one or more users (e.g., User A, User B, User C, and so on). Each of the global user parameter and local user parameter of a user can be generated by accessing and processing a plurality of data points associated with the user. Further, in some examples, each of a global user parameter and a local user parameter may be generated for a particular user. In some examples, either a global or local user parameter can be generated for a particular user.

Further, the global user parameter data points and the local user parameter data points can each be fed into a machine-learning model to generate a result that indicates a likelihood that the user will access a resource (e.g., the likelihood being represented by the normalized user parameter). The parameter generator 1325 can implement the machine-learning techniques to compute the global and/or local parameters for a user. For example, the combination of the global user parameter and the local user parameter may be implemented using one or more ensemble method learning algorithms. In some implementations, the algorithm used to calculate global user parameters may be a classifier model (e.g., a support vector machine (SVM) model, kernel methods, etc.), however, the present disclosure is not limited thereto. In some implementations, the algorithm used to calculate local user parameters may be a random forest model, however, the present disclosure is not limited thereto. The algorithms executed to calculate the global and local user parameters may be the same or may be different from each other. In some implementations, a final user parameter may be a combination of the calculated global user parameter and the calculated local user parameter. Combining the global user parameter and the calculated local user parameter may include any combination technique, including averaging, summing, subtracting, multiplying, dividing, a weighted combination, or any complex combination technique.

While FIG. 13 illustrates that user parameters for User A, User B, and User C are stored in each of data structures 1310 and 1320, it will be appreciated that any number of users can be represented in each of the data structures. For the purpose of illustration, User C is used to describe the global and local user parameters.

As a non-limiting example, the global user parameter can represent the likelihood that a user will ultimately access any resource generally. The global user parameter is not specific to a particular resource, but rather the global user parameter represents the general likelihood the user will access any resource. In some cases, the global user parameter can represent the degree to which the user is predicted to be a bot. In some cases, the global user parameter can represent the likelihood that a user will transfer an access right to another user. The global user parameter data may include previous access rights access by the user and other metadata associated with each instance of accessing a resource, such as date, time, location, whether or not the user actually accessed the resource after being assigned an access right to the resource, and so on.

Non-limiting examples of data points that are used to calculate the global user parameter can include a distance between a detected user location and any resource-associated locations (e.g., spatial regions of a resource), previous access right assignment data (e.g., has the user transferred other access rights previously?), the number of access rights that were assigned to the user within a specified time period, frequency of being assigned to access rights that enable access to a resource during a time period, and being assigned to access rights that enable access to another resource during that same time period, has the user requested assignment of multiple sets of access rights in different transactions, third-party data sets, the local user parameter of the user (e.g., the local user parameter can be used as a data point for the global user parameter, and vice versa), whether or not the user has requested assignment of an access right to a resource associated with a location that is different from the detected location of the user device (e.g., the location associated with the detected IP address), whether or not (and how many times) an access right requested by the user has been detected on a secondary load management system, how many times the user has ultimately accessed any resources using valid access rights, and other suitable data points. As described above, the global user parameter indicates a likelihood of meeting an objective, however, the objective is not specific to a particular resource, but rather, indicates the likelihood of meeting an objective associated with resources generally.

Continuing with the non-limiting example above, the local user parameter may be specific to an access right to a resource. For example, the local user parameter can represent a likelihood that a user will ultimately access a particular resource during a time period when the resource is enabled to be accessible.

Non-limiting examples of data points that are used to calculate the local user parameter can include any one or more of the data points used for the global user parameter, and additionally or alternatively, affinity data from social media networks, historical data representing which web servers were previously accessed, the data provided by the user during an initialization process, device type used during the initialization process (e.g. to register the user), whether or not the user has previously accessed resources associated with a particular entity, whether or not the user has accessed the specific resource before, whether or not the user has previously transferred an access right to the particular resource to another user device, whether or not the user requested assignment of an access right to a resource associated with a location that is different from the detected user location (e.g., the location associated with the detected IP address), and other suitable data points. It will be appreciated that there may be overlap between the global user parameter data points and the local user parameter data points. As described above, the difference between the global user parameter and the local user parameter is that the global user parameter represents a likelihood of the user meeting an objective associated with resources generally, whereas, the local user parameter represents a likelihood of the user meeting an objective associated with a particular resource. It will be appreciated that the data points associated with global user parameter may be inputted into the same machine-learning model or a different machine-learning model as the data points associated with the global user parameter.

It will be appreciated that the global user parameter and the local user parameter can be any integer or non-integer between any range of values. Further, the range of values the global user parameter may or may not be the same as the range of values for the local user parameter. In some implementations, the range of values for each of the global user parameter and the local user parameter may any value between zero and one. In some implementations, the global and local user parameters can be used to label users either positively or negatively. As a non-limiting example, when a user device completes the assignment process for an access right (e.g., the user requests that the access right be assigned to the user, and the access right is ultimately assigned to the user), and that user ultimately accesses the resource during the time period when the resource is accessible, the user can be labeled positively. In this example, a global user parameter of 0.9 may be calculated for the user, which indicates a high likelihood of meeting an objective associated with resources generally. As another example, if the user device completed the assignment process, and the access right was detected at a secondary load management system, the user may be labeled negatively. In this example, a global user parameter of 0.3 may be calculated for the user, which indicates a low likelihood of meeting an objective associated with resources generally.

Advantageously, if User C is requesting assignment for Resource A, but User C commonly transfers access rights to other user devices, the user parameter for User C in the context of Resource A may indicate that User C is likely to access Resource A during the time period when Resource A is accessible, whereas, the user parameter for User C in the context of Resource B may indicate that User C is not likely to access Resource B during the time period when Resource B is accessible.

Additionally, according to certain aspects and features described herein, when a user logs in to the online platform seeking to request access right(s) to a resource, the normalization system 1330 may retrieve the user parameter generated for that user. If the user is a new user, then a new user parameter may be generated for the user according to FIG. 13, or any other technique for generating a user parameter (e.g., a user score). Normalization system 1330 may access a protocol database 1335 to determine which protocols are to be executed for the resource to which the user is requesting access. The normalization system 1330 may execute the one or more protocols of the protocol set, which may cause some or all of the user parameter of the users requesting access to the resource to be normalized (e.g., modified). That is, a normalized user parameter specific to the resource may be generated for the purpose of assigning queue positions of a digital queue to the users.

Figure 14:
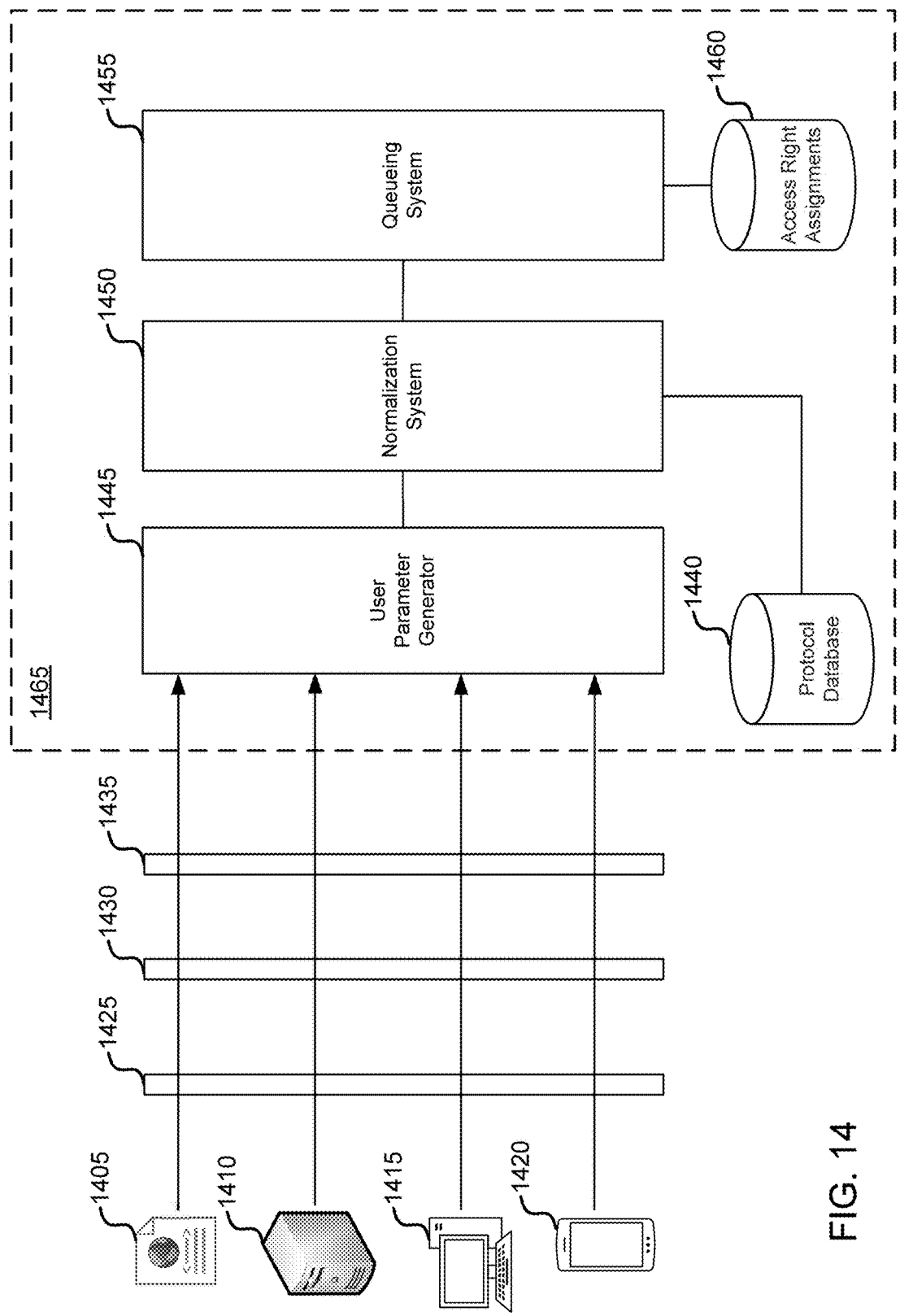
FIG. 14 is a block diagram illustrating a network environment for assigning queue positions of a digital queue to user devices based on a client-specific protocol, according to some aspects of the present disclosure.

FIG. 14 is a block diagram illustrating network environment 1400 for assigning queue positions of a digital queue to user devices based on a client-specific protocol set, according to some aspects of the present disclosure. In some implementations, network environment 1400 may include bot 1405, server 1410, computer 1415, and mobile device 1420. Network environment 1400 may also include primary load management system 1465, which may be a system that manages the assignment of access rights to various users. For example, primary load management system 1465 can store unique identifiers that uniquely identify access rights (not shown). Primary load management system 1465 may also store (in association with each unique identifier) a user identifier associated with a user to which the access right(s) is assigned in access right assignments database 1460. Bot 1405 may include scripts that can be executed to autonomously perform one or more functions. Bot 1405 can use Application Programming Interfaces (APIs) to interact with systems. Server 1410 may include one or more servers configured to directly interact with primary load management system 1465 (e.g., using scripts). For example, server 1410 may automatically transmit a communication to primary load management system 1465 to query for access rights to a resource without a human user initiating the interaction. In some cases, server 1410 can execute bot 1405. Computer 1415 can be operated by a user to interact with primary load management system 1465 to request assignment to access rights to resources. Mobile device 1420 can also be operated by a user to interact with primary load management system 1465 to request assignment of access rights to resources.

Each of bot 1405, server 1410, computer 1415, and mobile device 1420 may individually transmit a communication (each at any time) to primary load management system 1465. For example, each communication received may correspond to a request to access an interface that enables users to request assignment of access rights to a particular resource. That is, each of bot 1405, server 1410, computer 1415, and mobile device 1420 may be requesting access to the same resource. Detection layers 1425, 1430, and 1435 can detect and/or control unauthorized access to databases associated with primary load management system 1465. It will be appreciated that any number of detection layers may be implemented, and the various detection layers may be the same or different from each other. For example, detection layers 1425, 1430, and 1435 may each include a detection system or service that detects the presence of bots, hackers, specific systems (e.g., secondary management systems), or unauthorized user access using any number of detection techniques (e.g., IP blocking, client time limits, client request frequency limits, client request limits on access inventory, reverse TURING tests, speed or frequency of queries during a time period, API access behavior pattern evaluation, bot pattern evaluation of sensor data associated with the device transmitting the communication, and other suitable techniques), and then blocks the detected communications, systems, or users. Bots and other devices, however, may sometimes pass through the detection layers undetected. As illustrated in FIG. 14, communications from bot 1405, server 1410, computer 1415, and mobile device 1420 pass through detection layers 1425, 1430, and 1435 undetected. In this situation, primary load management system 1465 may still prevent bots and other bad actors from requesting access rights to a resource by prioritizing certain requests, such as the communication from mobile device 1420, over other requests, such as the communication from bot 1405 using the normalization system 1450.

The communication from each of bot 1405, server 1410, computer 1415, and mobile device 1420 may be received at user parameter generator 1445. A user parameter may already have been generated for bot 1405, server 1410, computer 1415, and/or mobile device 1420. In that case, the corresponding user parameter may be queried from a database that stores user parameters. User parameter generator 1445 may extract a unique user identifier from the communications received, and use that unique user identifier to retrieve the corresponding user parameter. If any of bot 1405, server 1410, computer 1415, or mobile device 1420 does not have a user parameter (e.g., if any of these users are new to the online platform), then user parameter generator 1445 may generate a user parameter using any user scoring technique. For example, the techniques described in FIG. 13 may be executed to generate a new user parameter for a new user.

Normalization system 1450 may retrieve the user parameters for each of bot 1405, server 1410, computer 1415, and mobile device 1420. Further, normalization system 1450 may detect a resource identifier included in the communication received from each of bot 1405, server 1410, computer 1415, and mobile device 1420. Normalization system 1450 may then retrieve one or more protocols from protocol database 1440. Normalization system 1450 may then execute the retrieved protocols. Executing the protocol may cause the normalization system 1450 to modify one or more of the retrieved user parameters. To illustrate and as a non-limiting example, the protocol may include executable code that, when executed, transmits a list of user identifiers to the normalization system 1450. The list may include user identifiers for users that are included in a predetermined group (e.g., a club targeted by the client). The list may be defined by a client associated with the resource. Normalization system 1450 can then match the user identifiers in the list against the user identifiers of bot 1405, server 1410, computer 1415, and mobile device 1420. For example, the user identifier for mobile device 1420 may be included in the list of user identifiers. In this non-limiting example, normalization system 1450 may then normalize the user parameters associated with bot 1405, server 1410, computer 1415, and mobile device 1420 by subtracting a value (e.g., 0.3) from each of the user parameters for bot 1405, server 1410, and computer 1415 and adding a value (0.8) to the user parameter for mobile device 1420. Normalization system 1450 may then transmit the normalized user parameters to queuing system 1455, which may be configured to assign a queue position to each of bot 1405, server 1410, computer 1415, and mobile device 1420. Continuing with the non-limiting example above, queuing system 1455 may assign the first queue position in a digital queue associated with the resource to mobile device 1420; the second through fourth queue positions to bot 1405, server 1410, and computer 1415 according to the corresponding normalized user parameters. Because the mobile device 1420 is assigned the first queue position in the digital queue, the mobile device may be granted access to the interface to request assignment of access rights to the resource before the bot 1405, server 1410, and computer 1415. Bot 1405, server 1410, and computer 1415 may be granted access to the interface in accordance with the corresponding queue positions in the digital queue. Advantageously, each client can define which attributes of users are to be prioritized for the corresponding resource, and thus, automated scripts may be prevented from accessing resources in a dynamic and client-specific manner.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, processes, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently, or in any combination. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

We claim:

1. A method for managing user access to a digital resource across multiple devices, comprising:
   generating a user interface with authentication capabilities to facilitate user access to the digital resource;
   collecting device-specific parameters from each user device upon user interaction;
   supplementing collected parameters with additional device-related information sourced from diverse data sources;
   querying the data sources to determine device information, wherein user login status is determined based on the device information;
   initiating a reduction in a number of user parameters upon detection of a logged-out state;
   receiving user parameters within a normalization system for generating normalized parameters based on received data;
   assigning a queue position within a digital queue to each user device based on its identifier and normalized parameters, reflecting an order of devices awaiting interface access;
   updating normalized parameters based on user login status; and
   reordering queue positions within the digital queue for each device based on the updated normalized parameters.

2. The method of claim 1, wherein normalized parameters and queue positions are updated in real-time, ensuring timely adjustments to user access priorities.

3. The method of claim 1, further comprising preventing, via the user interface, a user from creating or transmitting requests to the digital resource for access control measures.

4. The method of claim 1, wherein normalization of user parameters occurs in backend systems, streamlining data processing operations.

5. The method of claim 1, reducing, via the normalization system, user parameters retrieved from various data sources, optimizing resource allocation and enhancing system performance.

6. The method of claim 1, wherein a digital queue is assigned to the user without any visual indication in the user interface, maintaining user privacy and confidentiality.

7. The method of claim 1, wherein the user is assigned a queue position even when in a logged-out state, ensuring fair access to the digital resource regardless of a user's current login status.

8. A system for managing user access to a digital resource across multiple devices, the system comprising:
   one or more processors;
   a non-transitory computer-readable storage medium containing instructions which, when executed on the one or more processors, cause the one or more processors to perform operations including:
      generating a user interface with authentication capabilities to facilitate user access to the digital resource;
      collecting device-specific parameters from each user device upon user interaction;
      supplementing collected parameters with additional device-related information sourced from diverse data sources;
      querying the data sources to determine device information, wherein the device information enables in determination of user login status;
      initiating a reduction in a number of user parameters upon detection of a logged-out state;
      receiving user parameters within a normalization system for generating normalized parameters based on received data;
      assigning a queue position within a digital queue to each user device based on its identifier and normalized parameters, reflecting an order of devices awaiting interface access;
      updating normalized parameters based on user login status; and
      reordering queue positions within the digital queue for each device based on the updated normalized parameters.

9. The system of claim 8, wherein the operations for updating normalized parameters and reordering queue positions are performed in real-time, facilitating timely adjustments to user access priorities.

10. The system of claim 8, further comprising a user interface control module configured to:
    prevent a user from creating or transmitting requests to the digital resource via the user interface, and
    implement access control measures in alignment with the generated user interface.

11. The system of claim 8, wherein the normalization system includes backend systems for normalization of user parameters, thereby streamlining data processing operations as instructed by the received user parameters.

12. The system of claim 8, wherein the normalization system includes a parameter reduction mechanism for reducing user parameters retrieved from various data sources, optimizing resource allocation and enhancing system performance in accordance with the collected device-specific parameters.

13. The system of claim 8, further comprising a queue assignment module that is configured to assign a digital queue to the user without any visual indication in the user interface, thereby maintaining user privacy and confidentiality in line with the generated user interface.

14. The system of claim 13, wherein the queue assignment module is further configured to assign a queue position to the user even when in a logged-out state, ensuring fair access to the digital resource regardless of a user's current login status, in accordance with the updated normalized parameters.

15. A computer-program product tangibly embodied in a non-transitory machine-readable storage medium, including instructions configured to a cause a processing apparatus to perform operations including:
    generating a user interface with authentication capabilities to facilitate user access to a digital resource;
    collecting device-specific parameters from each user device upon user interaction;
    supplementing collected parameters with additional device-related information sourced from diverse data sources;
    querying the data sources to determine device information, wherein the device information enables in determination of user login status;
    initiating a reduction in a number of user parameters upon detection of a logged-out state;
    receiving user parameters within a normalization system for generating normalized parameters based on received data;

assigning a queue position within a digital queue to each user device based on its identifier and normalized parameters, reflecting an order of devices awaiting interface access;

updating normalized parameters based on user login status; and reordering queue positions within the digital queue for each device based on the updated normalized parameters.

16. The computer-program product as recited in claim 15, wherein normalized parameters and queue positions are updated in real-time, ensuring timely adjustments to user access priorities.

17. The computer-program product as recited in claim 15, further comprising preventing, via the user interface, a user from creating or transmitting requests to the digital resource for access control measures.

18. The computer-program product as recited in claim 15, wherein normalization of user parameters occurs in backend systems, streamlining data processing operations.

19. The computer-program product as recited in claim 15, wherein a digital queue is assigned to the user without any visual indication in the user interface, maintaining user privacy and confidentiality.

20. The computer-program product as recited in claim 15, wherein the user is assigned a queue position even when in a logged-out state, ensuring fair access to the digital resource regardless of a user's current login status.

* * * * *